United States Patent
Kim et al.

(10) Patent No.: US 12,351,146 B2
(45) Date of Patent: Jul. 8, 2025

(54) ELECTRONIC BRAKE SYSTEM AND OPERATING METHOD THEREOF

(71) Applicant: HL MANDO CORPORATION, Gyeonggi-do (KR)

(72) Inventors: Jinseok Kim, Gyeonggi-do (KR); Seongho Choi, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 188 days.

(21) Appl. No.: 18/270,204

(22) PCT Filed: Dec. 29, 2021

(86) PCT No.: PCT/KR2021/020219
§ 371 (c)(1),
(2) Date: Jun. 28, 2023

(87) PCT Pub. No.: WO2022/146053
PCT Pub. Date: Jul. 7, 2022

(65) Prior Publication Data
US 2024/0059267 A1 Feb. 22, 2024

(30) Foreign Application Priority Data
Dec. 29, 2020 (KR) .................. 10-2020-0185702

(51) Int. Cl.
*B60T 17/22* (2006.01)
*B60T 13/66* (2006.01)

(52) U.S. Cl.
CPC .......... *B60T 17/221* (2013.01); *B60T 13/662* (2013.01); *B60T 2270/406* (2013.01)

(58) Field of Classification Search
CPC ............... B60T 17/221; B60T 13/662; B60T 2270/406; B60T 2270/402; B60T 8/171;
(Continued)

(56) References Cited

U.S. PATENT DOCUMENTS 5,039,175 A * 8/1991 Holzmann ............ B60T 8/4225
                                                303/116.1
11,993,233 B2 * 5/2024 Kim ..................... B60T 13/142
(Continued)

FOREIGN PATENT DOCUMENTS

JP          3972859       9/2007
JP       2010-137617       6/2010
(Continued)

OTHER PUBLICATIONS

International Search Report for PCT/KR2021/020219 mailed on Apr. 20, 2022 and its English Machine Translation by the WIPO (now published as WO 2022/146053).
(Continued)

*Primary Examiner* — Sizo B Vilakazi
(74) *Attorney, Agent, or Firm* — WOMBLE BOND DICKINSON (US) LLP

(57) ABSTRACT

Disclosed are an electronic brake system and an operating method thereof. The electronic brake system according to the present embodiment comprises: a reservoir having a pressurization medium stored therein; an integrated master cylinder having a master piston, a master chamber of which the volume varies according to the displacement of the master piston, and a sealing member sealing the master chamber; a simulator valve that controls the flow of the pressurization medium between the reservoir and the master chamber; a hydraulic supply device that operates a hydraulic piston on the basis of an electrical signal output in response to a displacement of the brake pedal and generates hydraulic pressure; and a hydraulic control unit provided between the hydraulic supply device and a plurality of wheel cylinders, wherein whether a component element including the integrated master cylinder leaks may be determined on the basis
(Continued)

of an inspection flow path connected to the master chamber and an inspection valve provided in the inspection flow path.

20 Claims, 9 Drawing Sheets

(58) Field of Classification Search
CPC .... B60T 8/4081; B60T 13/142; B60T 13/686; B60T 13/745; B60T 11/224; B60T 17/22; B60T 13/148; B60Y 2304/05; B60Y 2304/07; B60Y 2306/15; B60Y 2400/306; B60Y 2400/81

See application file for complete search history.

(56) References Cited

U.S. PATENT DOCUMENTS

| | | | | |
|---|---|---|---|---|
| 2022/0203949 A1* | 6/2022 | Kim | ................. | B60T 7/042 |
| 2022/0219664 A1* | 7/2022 | Kim | ................. | B60T 13/686 |
| 2022/0396250 A1* | 12/2022 | Ryu | ................. | B60T 13/745 |
| 2023/0071822 A1* | 3/2023 | Park | ................. | B60T 13/686 |
| 2024/0083402 A1* | 3/2024 | Kim | ................. | B60T 13/148 |

FOREIGN PATENT DOCUMENTS

| | | |
|---|---|---|
| KR | 10-2017-0130995 | 11/2017 |
| KR | 10-2019-0037765 | 4/2019 |
| KR | 10-2020-0138577 | 12/2020 |
| KR | 10-2021-0128640 | 10/2021 |
| WO | 2018/003539 | 1/2018 |

OTHER PUBLICATIONS

Written Opinion of the International Searching Authority for PCT/KR2021/020219 mailed on Apr. 20, 2022 and its English Machine Translation by the WIPO (now published as WO 2022/146053).

* cited by examiner

ELECTRONIC BRAKE SYSTEM AND OPERATING METHOD THEREOF

CROSS-REFERENCE TO RELATED APPLICATIONS

This application is the U.S. National Stage of International Patent Application No. PCT/KR2021/020219 filed on Dec. 29, 2021, which claims priority to and benefit of Korean Patent Application No. 10-2020-0185702, filed on Dec. 29, 2020, the disclosures of which are incorporated herein by reference in their entirety.

TECHNICAL FIELD

The present invention relates to an electronic brake system and an operating method thereof, and more particularly, to an electronic brake system for generating a braking force using an electrical signal in response to a displacement of a brake pedal and an operating method thereof.

BACKGROUND ART

In vehicles, a brake system for braking is necessarily installed, and various types of brake systems have been suggested for the safety of drivers and passengers.

In brake systems in the related art, a method in which, when a driver presses a brake pedal, hydraulic pressure required for braking is supplied to a wheel cylinder using a mechanically connected booster is mainly used. However, as a market demand to implement various braking functions by responding in detail to a vehicle operating environment increases, electronic brake systems that receive a driver's willingness to brake as an electrical signal from a pedal displacement sensor for detecting a displacement of a brake pedal when the driver presses the brake pedal and operate a hydraulic pressure supply device based on the electrical signal so that hydraulic pressure required for braking is supplied to a wheel cylinder have recently been widely spread.

Such an electronic brake system generates and provides an electrical signal of brake pedal operation of a driver in a normal operating mode or a determination that braking should be performed during autonomous driving of a vehicle, and the hydraulic pressure supply device is electrically operated and controlled based on the electrical signal, thereby forming hydraulic pressure required for braking and transmitting the hydraulic pressure to the wheel cylinder. As described above, the electronic brake system and the operating method thereof are electrically operated and controlled, and thus the electronic brake system and the operating method thereof may implement complex and various braking actions, but when a technical problem occurs in an electric component element, the hydraulic pressure required for braking is not stably generated, which may threaten the safety of occupants.

Accordingly, when one component element is broken or out of control, the electronic brake system enters an abnormal operating mode, and in this case, a mechanism in which a driver's brake pedal operation is directly linked to the wheel cylinder is required. That is, in the abnormal operating mode of the electronic brake system, it is required that, when the driver applies a pressing force to the brake pedal, the hydraulic pressure required for braking is immediately generated and transmitted directly to the wheel cylinder. Furthermore, in order to promote the safety of occupants by quickly entering the abnormal operating mode in case of an emergency, a method capable of accurately and quickly inspecting a failure of the electronic brake system is required.

Technical Problem

The present invention is directed to providing an electronic brake system capable of effectively implementing braking in various operating situations and an operating method thereof.

The present invention is directed to providing an electronic brake system capable of quickly determining whether or not there is a failure with a simple structure and operation, and an operating method thereof.

The present invention is directed to providing an electronic brake system with improved braking performance and operational reliability and an operating method thereof.

The present invention is directed to providing an electronic brake system with improved product durability by reducing a load applied to a component element and an operating method thereof.

The present invention is directed to providing an electronic brake system capable of improving product assembly and productivity and reducing manufacturing costs of a product and an operating method thereof.

Technical Solution

One aspect of the present invention provides an electronic brake system including a reservoir in which a pressurized medium is stored, an integrated master cylinder equipped with a master piston connected to a brake pedal, a master chamber whose volume is varied by a displacement of the master piston, and a sealing member configured to seal the master chamber, a simulator valve configured to control a flow of the pressurized medium between the reservoir and the master chamber, a hydraulic pressure supply device configured to generate hydraulic pressure by operating a hydraulic piston by an electrical signal output in response to a displacement of the brake pedal, a hydraulic pressure control unit provided between the hydraulic pressure supply device and a plurality of wheel cylinders to control the flow of the pressurized medium supplied to the plurality of wheel cylinders, a dump controller provided between the reservoir and the hydraulic pressure supply device to control the flow of the pressurized medium, a backup flow path connecting the master chamber and the hydraulic pressure control unit, a cut valve provided on the backup flow path to control the flow of the pressurized medium, a first pressure sensor configured to detect the hydraulic pressure provided by the hydraulic pressure supply device, a second pressure sensor configured to detect hydraulic pressure of the master chamber, an inspection flow path connecting the master chamber and the dump controller, and an inspection valve provided on the inspection flow path to control the flow of the pressurized medium.

The integrated master cylinder may include a first master piston connected to the brake pedal, a first master chamber whose volume is varied by a displacement of the first master piston, a second master piston provided to be displaceable by the displacement of the first master piston, a second master chamber whose volume is varied by a displacement of the second master piston, and a pedal simulator provided between the first master piston and the second master piston and made of a compressible and expandable elastic material, and the second pressure sensor may detect hydraulic pressure of the second master chamber.

The inspection flow path may have one end connected to the dump controller side and the other end branched into a first branch flow path and a second branch flow path that are each connected to the first master chamber, the inspection valve may be provided at one end side of the inspection flow path, and the electronic brake system may further include a first inspection check valve provided on the first branch flow path and allowing only a flow of the pressurized medium from the dump controller toward the first master chamber and a second inspection check valve provided on the second branch flow path and allowing only a flow of the pressurized medium from the first master chamber toward the dump controller.

The hydraulic pressure supply device may include a first pressure chamber provided in front of the hydraulic piston and a second pressure chamber provided behind the hydraulic piston, the dump controller may include a first dump controller configured to control a flow of the pressurized medium between the first pressure chamber and the reservoir, and a second dump controller configured to control a flow of the pressurized medium between the second pressure chamber and the reservoir, and the one end of the inspection flow path may be connected to the second dump controller side.

The electronic brake system may further include a first reservoir flow path connecting the reservoir and the first master chamber, and the simulator valve may be provided on the first reservoir flow path.

The hydraulic pressure control unit may include a first hydraulic circuit configured to control a flow of the pressurized medium supplied to a first wheel cylinder and a second wheel cylinder, and a second hydraulic circuit configured to control a flow of the pressurized medium supplied to a third wheel cylinder and a fourth wheel cylinder, the backup flow path, a first backup flow path connecting the first master chamber and the first hydraulic circuit, and a second backup flow path connecting the second master chamber and the second hydraulic circuit, and the cut valve may include a first cut valve provided on the first backup flow path to control the flow of the pressurized medium, and a second cut valve provided in the second master chamber to control the flow of the pressurized medium.

The integrated master cylinder may further include a first sealing member configured to seal the first master chamber from the outside and a second sealing member configured to seal the first master chamber from the second master chamber and a third sealing member configured to block a flow of the pressurized medium introduced into the first master chamber from the first branch flow path.

The electronic brake system may further include a second reservoir flow path connecting the reservoir and the second master chamber, and the integrated master cylinder may further include a fourth sealing member configured to block a flow of the pressurized medium discharged from the second master chamber to the second reservoir flow path.

The first sealing member may be provided at a rear side of the third sealing member, and the second branch flow path may be connected between the first sealing member and the third sealing member on the integrated master cylinder.

The first master piston may include a first cut-off hole that allows the first master chamber to communicate with the second branch flow path in a non-operating state, and the second master piston may include a second cut-off hole that allows the second master chamber to communicate with the second reservoir flow path in the non-operating state.

Another aspect of the present invention provides an electronic brake system including a reservoir in which a pressurized medium is stored, an integrated master cylinder equipped with a master piston connected to a brake pedal, a master chamber whose volume is varied by a displacement of the master piston, and a sealing member configured to seal the master chamber, a simulator valve configured to control a flow of the pressurized medium between the reservoir and the master chamber, a hydraulic pressure supply device configured to generate hydraulic pressure by operating a hydraulic piston by an electrical signal output in response to a displacement of the brake pedal, a hydraulic pressure control unit provided between the hydraulic pressure supply device and a plurality of wheel cylinders to control the flow of the pressurized medium supplied to the plurality of wheel cylinders, a backup flow path connecting the master chamber and the hydraulic pressure control unit, a cut valve provided on the backup flow path to control the flow of the pressurized medium, a first pressure sensor configured to detect the hydraulic pressure provided by the hydraulic pressure supply device, a second pressure sensor configured to detect hydraulic pressure of the master chamber, an inspection flow path connecting the reservoir and the master chamber, and an inspection valve provided on the inspection flow path to control the flow of the pressurized medium, and the master piston includes a cut-off hole that allows the master chamber to communicate with the inspection flow path in a non-operating state and blocks the master chamber from the inspection flow path when the displacement occurs.

The integrated master cylinder may include a first master piston connected to the brake pedal, a first master chamber whose volume is varied by a displacement of the first master piston, a second master piston provided to be displaceable by the displacement of the first master piston, a second master chamber whose volume is varied by a displacement of the second master piston, and a pedal simulator provided between the first master piston and the second master piston and made of a compressible and expandable elastic material, the first master piston may include a first cut-off hole that allows the first master chamber to communicate with the inspection flow path in a non-operating state, and the second pressure sensor may detect hydraulic pressure of the second master chamber.

The inspection flow path may have one end connected to the reservoir side and the other end connected to the first master chamber.

The electronic brake system may further include a first reservoir flow path connecting the reservoir and the first master chamber, and the simulator valve may be provided on the first reservoir flow path.

The hydraulic pressure control unit may include a first hydraulic circuit configured to control a flow of the pressurized medium supplied to a first wheel cylinder and a second wheel cylinder, and a second hydraulic circuit configured to control a flow of the pressurized medium supplied to a third wheel cylinder and a fourth wheel cylinder, the backup flow path may include a first backup flow path connecting the first master chamber and the first hydraulic circuit, and a second backup flow path connecting the second master chamber and the second hydraulic circuit, and the cut valve may include a first cut valve provided on the first backup flow path to control the flow of the pressurized medium, and a second cut valve provided in the second master chamber to control the flow of the pressurized medium.

The electronic brake system may further include an auxiliary inspection flow path connecting the reservoir and the first master chamber, and the integrated master cylinder may further include a first sealing member configured to seal the first master chamber from the outside and a second sealing member configured to seal the first master chamber from the second master chamber and a third sealing member configured to block a flow of the pressurized medium introduced into the auxiliary inspection flow path from the first master chamber.

The electronic brake system may further include a second reservoir flow path connecting the reservoir and the second master chamber, and the integrated master cylinder may further include a fourth sealing member configured to block a flow of the pressurized medium discharged from the second master chamber to the second reservoir flow path.

The first sealing member may be provided at a rear side of the third sealing member, and the inspection flow path may be connected between the first sealing member and the third sealing member on the integrated master cylinder.

A first inspection mode and a second inspection mode for inspecting whether or not there is a leak in the integrated master cylinder or the simulator valve may be included, and in the first inspection mode, the hydraulic piston may be moved forward so that the hydraulic pressure formed in the first pressure chamber is supplied to the first master chamber by sequentially passing through the hydraulic pressure control unit, the hydraulic circuit, and the backup flow path, and an electronic control unit may determine whether or not there is the leak by comparing a hydraulic pressure value detected by the first pressure sensor and a hydraulic pressure value detected by the second pressure sensor.

In the second inspection mode, the second pressure chamber may be blocked from the reservoir by the second dump controller, the inspection valve may be opened to allow the second pressure chamber to communicate with the inspection flow path, the hydraulic piston may be moved backward to generate hydraulic pressure in the second pressure chamber, and the electronic control unit may determine whether or not there is the leak based on a displacement amount of the hydraulic piston.

Advantageous Effects

An electronic brake system and an operating method thereof according to the present invention can stably and effectively implement braking in various operating situations of a vehicle.

An electronic brake system and an operating method thereof according to the present invention can promote the safety of occupants by quickly and accurately determining whether or not there is a failure of a device with a simple structure and operation.

An electronic brake system and an operating method thereof according to the present invention can improve braking performance and operation reliability.

An electronic brake system and an operating method thereof according to the present invention can stably provide braking pressure even when a component element fails or a pressurized medium is leaked.

An electronic brake system and an operating method thereof according to the present invention have an effect of improving product durability by reducing a load applied to a component element.

An electronic brake system and an operating method thereof according to the present invention can improve product assembly and productivity and reduce manufacturing costs.

MODES OF THE INVENTION

Figure 1:
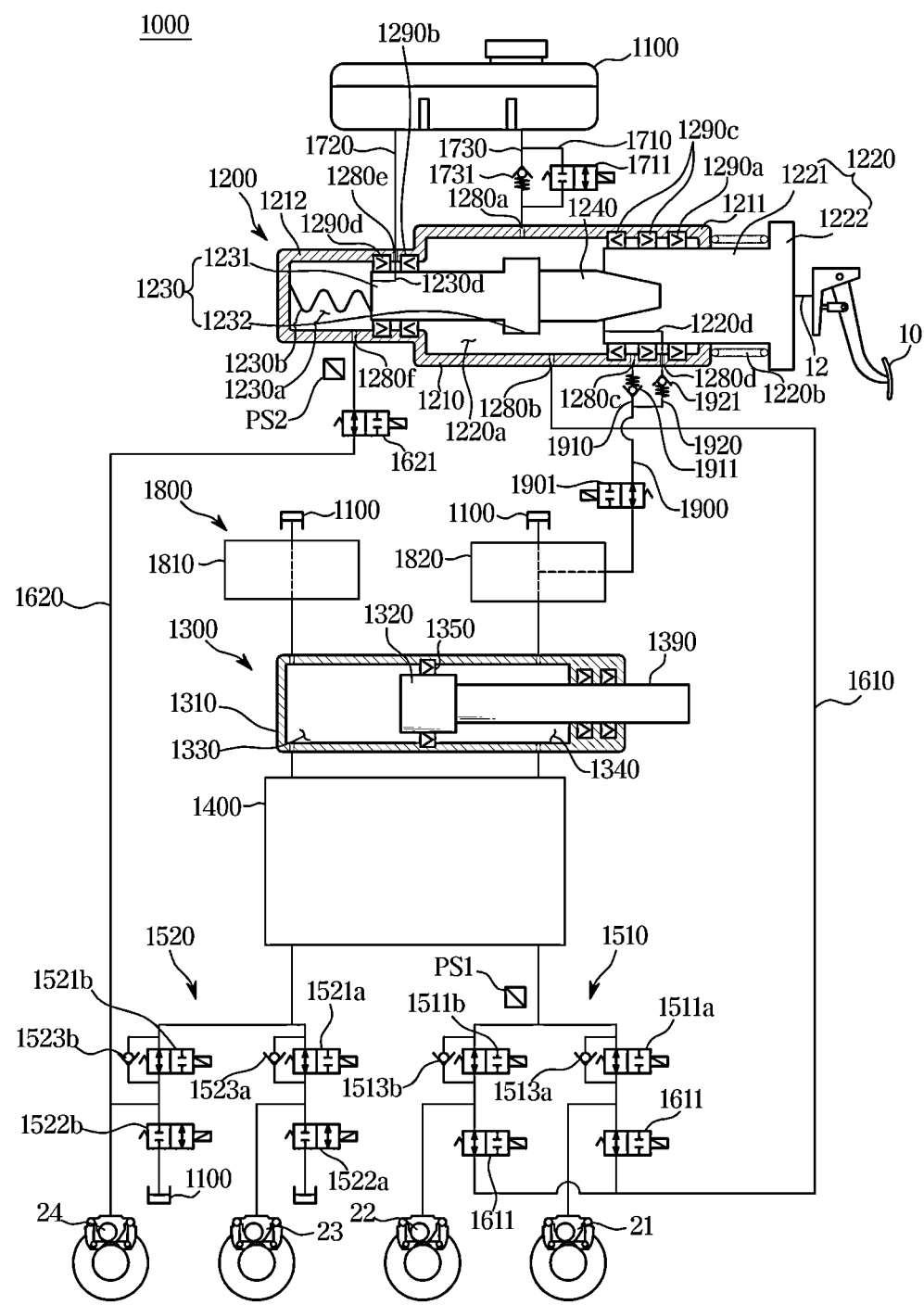
FIG. 1 is a hydraulic circuit diagram illustrating an electronic brake system according to a first embodiment of the present invention.

Hereinafter, embodiments of the present invention will be described in detail with reference to the accompanying drawings. The following embodiments are provided to completely convey the spirit of the present invention to those skilled in the art to which the present invention pertains. The present invention is not limited to the embodiments shown herein and may be embodied in other forms. In the drawings, parts that bear no relation to descriptions may be omitted in order to clarify the present invention, and elements may be exaggerated in sizes thereof for ease of understanding.

FIG. 1 is a hydraulic circuit diagram illustrating an electronic brake system 1000 according to a first embodiment of the present invention.

Referring to FIG. 1, the electronic brake system 1000 according to the first embodiment of the present invention includes a reservoir 1100 in which a pressurized medium is stored, an integrated master cylinder 1200 that provides a reaction force of a brake pedal 10 to a pressing force to a driver, and at the same time, pressurizes and discharges a pressurized medium, such as brake oil, stored therein, a hydraulic pressure supply device 1300 that generates hydraulic pressure of the pressurized medium through mechanical operation by receiving a driver's willingness to brake as an electrical signal by a pedal displacement sensor 11 for detecting a displacement of the brake pedal 10, a hydraulic pressure control unit 1400 for controlling the hydraulic pressure provided by the hydraulic pressure supply device 1300, hydraulic circuits 1510 and 1520 equipped with wheel cylinders 20 for braking respective wheels RR, RL, FR, and FL as the hydraulic pressure of the pressurized medium is transmitted, a dump controller 1800 provided between the hydraulic pressure supply device 1300 and the reservoir 1100 to control a flow of the pressurized medium, backup flow paths 1610 and 1620 for hydraulically connecting the integrated master cylinder 1200 and the hydraulic circuits 1510 and 1520, a reservoir flow path 1700 for hydraulically connecting the reservoir 1100 and the integrated master cylinder 1200, an inspection flow path 1900 connected to a master chamber of the integrated master cylinder 1200, and an electronic control unit (ECU) (not illustrated) for controlling the hydraulic pressure supply device 1300 and various valves based on hydraulic pressure information and pedal displacement information.

The integrated master cylinder 1200 is provided to provide a stable pedal feeling by providing a reaction force against a pressing force to the driver when the driver applies the pressing force to the brake pedal 10 for braking operation, and at the same time, pressurize and discharge the pressurized medium accommodated therein by the operation of the brake pedal 10.

Figure 2:
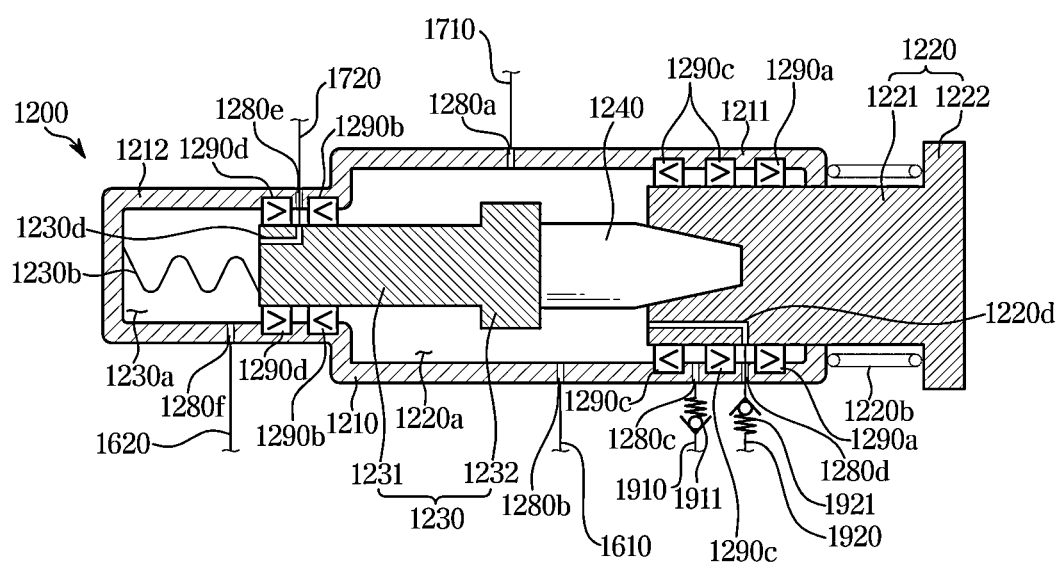
FIG. 2 is an enlarged view of part A of FIG. 1.

FIG. 2 is an enlarged view of part A of FIG. 1, and referring to FIGS. 1 and 2, in the integrated master cylinder 1200, a simulation part for providing a pedal feeling to the driver and a master cylinder part for pressurizing and discharging the pressurized medium accommodated therein by the pressing force of the brake pedal may be coaxially disposed in one cylinder body 1210.

Specifically, the integrated master cylinder 1200 may include a cylinder body 1210 having a chamber formed therein, a first master chamber 1220a formed on an inlet side of the cylinder body 1210 to which the brake pedal 10 is connected, a first master piston 1220 provided in the first master chamber 1220a and connected to the brake pedal 10 to be displaceable by operation of the brake pedal 10, a second master chamber 1230a formed on the inner or front side of the first master chamber 1220a (on the left side of FIG. 1) on the cylinder body 1210, a second master piston 1230 provided in the second master chamber 1230a to be displaceable by a displacement of the first master piston 1220 or the hydraulic pressure of the pressurized medium accommodated in the first master chamber 1220a, and a pedal simulator 1240 disposed between the first master piston 1220 and the second master piston 1230 to provide a pedal feeling through an elastic restoring force generated when pressurized.

The first master chamber 1220a and the second master chamber 1230a may be sequentially formed toward the inside (the left side of FIG. 1) from the side (the right side of FIG. 1) of the brake pedal 10 on the cylinder body 1210 of the integrated master cylinder 1200. In addition, the first master piston 1220 and the second master piston 1230 are disposed in the first master chamber 1220a and the second master chamber 1230a, respectively, to generate a hydraulic pressure in the pressurized medium accommodated in the respective chambers or generate or a negative pressure, depending on forward or backward movement.

The cylinder body 1210 may include a large-diameter portion 1211 in which the first master chamber 1220a is formed and whose inner diameter is formed to be relatively large, and a small-diameter portion 1212 in which the second master chamber 1230a is formed and whose inner diameter is formed to be relatively small compared to the large-diameter portion 1211. The large-diameter portion 1211 and the small-diameter portion 1212 of the cylinder body 1210 may be integrally formed.

The first master chamber 1220a may be formed in the large-diameter portion 1211, which is on the inlet side or the rear side (right side of FIG. 1) of the cylinder body 1210, and in the first master chamber 1220a, the first master piston 1220 connected to the brake pedal 10 via an input rod 12 may be accommodated to be reciprocally movable.

The pressurized medium may be introduced into and discharged from the first master chamber 1220a through a first hydraulic port 1280a, a second hydraulic port 1280b, a third hydraulic port 1280c, and a fourth hydraulic port 1280d. The first hydraulic port 1280a may be connected to a first reservoir flow path 1710 to be described below so that the pressurized medium is introduced into the first master chamber 1220a from the reservoir 1100, or the pressurized medium accommodated in the first master chamber 1220a is discharged to the reservoir 1100, and the second hydraulic port 1280b may be connected to the first backup flow path 1610 to be described below so that the pressurized medium is discharged into the first backup flow path 1610 from the first master chamber 1220a or conversely, the pressurized medium is introduced into the first master chamber 1220a from the first backup flow path 1610.

In addition, the first master chamber 1220a may be connected to the first and second branch flow paths 1910 and 1920 of the inspection flow path 1900 to be described below through the third hydraulic port 1280c and the fourth hydraulic port 1280d, respectively, so that the pressurized medium accommodated in the first master chamber 1220a is discharged into the inspection flow path 1900 or the pressurized medium is introduced into the first master chamber 1220a from the inspection flow path 1900.

The first master piston 1220 may be provided to be accommodated in the first master chamber 1220a and generate hydraulic pressure by pressurizing the pressurized medium accommodated in the first master chamber 1220a by moving forward (a left direction in FIG. 1) or generate a negative pressure in the first master chamber 1220a by moving backward (a right direction in FIG. 1). The first master piston 1220 may include a first body 1221 formed in a cylindrical shape to come into close contact with an inner circumferential surface of the first master chamber 1220a, and a first flange 1222 formed to extend in a radial direction at a rear end (a right end in FIG. 1) of the first body 1221 and to which the input rod 12 is connected. The first master piston 1220 may be elastically supported by a first piston spring 1220b, and the first piston spring 1220b may be provided so that one end thereof is supported by a front surface (a left surface of FIG. 1) of the first flange 1222, and the other end thereof is supported by an outer surface of the cylinder body 1210.

The first master piston 1220 is provided with a first cut-off hole 1220d that communicates with the first master chamber 1220a and communicates with the fourth hydraulic port 1280d and the second branch flow path 1920 in a non-operating state, that is, in a ready state before a displacement occurs. In addition, a first sealing member 1290a for sealing the first master chamber 1220a from the outside may be provided between an outer circumferential surface of the first master piston 1220 and the cylinder body 1210. The first sealing member 1290a may be provided to be seated in an accommodating groove recessed in an inner circumferential surface of the cylinder body 1210 to come into contact with the outer circumferential surface of the first master piston 1220, and by the first sealing member 1290a, the pressurized medium accommodated in the first master chamber 1220a may be prevented from leaking to the outside and foreign substances may be prevented from being introduced into the first master chamber 1220a. The first sealing member 1290a may be provided on an outermost side on the inner circumferential surface of the cylinder body 1210, that is, the rear side (the right side of FIG. 1) of the fourth hydraulic port 1280d to which the second branch flow path 1920 to be described below is connected.

Between the outer circumferential surface of the first master piston 1220 and the cylinder body 1210, a third sealing members 1290c for blocking a flow of the pressurized medium introduced into the first master chamber 1220a from the first branch flow path 1910 connected to the third hydraulic port 1280c may be provided. The third sealing members 1290c may be respectively seated in a pair of accommodating grooves recessed at the front and rear of the third hydraulic port 1280c, respectively, on the inner circumferential surface of the cylinder body 1210 to come into contact with the outer circumferential surface of the first master piston 1220. The pair of third sealing members 1290c may be provided at the front (the left side of FIG. 1) of the first sealing member 1290a, and may allow a flow in which the pressurized medium accommodated in the first master chamber 1220a is transmitted to the first branch flow path 1910 through the third hydraulic port 1280c and block the flow of the pressurized medium introduced into the first master chamber 1220a from the first branch flow path 1910.

The second master chamber 1230a may be formed in the small-diameter portion 1212 which is positioned on an inner or front side (the left side of FIG. 1) on the cylinder body 1210, and in the second master chamber 1230a, the second master piston 1230 may be accommodated to be reciprocally movable.

The pressurized medium may be introduced into and discharged from the second master chamber 1230a through a fifth hydraulic port 1280e and a sixth hydraulic port 1280f. The fifth hydraulic port 1280e may be connected to a second reservoir flow path 1720 to be described below so that the pressurized medium accommodated in the reservoir 1100 is introduced into the second master chamber 1230a. In addition, the sixth hydraulic port 1280d may be connected to a second backup flow path 1620 to be described below so that the pressurized medium accommodated in the second master chamber 1230a is discharged into the second backup flow path 1620, and conversely, the pressurized medium may be introduced into the second master chamber 1230a from the second backup flow path 1620.

The second master piston 1230 may be provided to be accommodated in the second master chamber 1230a, and may generate hydraulic pressure of the pressurized medium accommodated in the second master chamber 1230a by moving forward, and generate a negative pressure in the second master chamber 1230a by moving backward. The second master piston 1230 may include a second body 1231 formed in a cylindrical shape to come into close contact with an inner circumferential surface of the second master chamber 1230a, and a second flange 1232 formed to extend in a radial direction at a rear end (a right end in FIG. 1) of the second body 1231 and disposed in the first master chamber 1220a. A diameter of the second flange 1232 may be formed to be larger than that of the inner circumferential surface of the second master chamber 1230a. The second master piston 1230 may be elastically supported by a second piston spring 1230b, and the second piston spring 1230b may be provided so that one end thereof is supported by a front surface (a left surface of FIG. 1) of the second body 1231, and the other end thereof is supported by an inner surface of the cylinder body 1210.

A second sealing member 1290b for sealing the first master chamber 1220a from the second master chamber 1230a may be provided between an outer circumferential surface of the second master piston 1230 and the cylinder body 1210. The second sealing member 1290b may be provided to be seated in an accommodating groove recessed in the inner circumferential surface of the cylinder body 1210 to come into contact with the outer circumferential surface of the second master piston 1230, and by the second sealing member 1290b, the pressurized medium accommodated in the first master chamber 1220a may be prevented from leaking into the second master chamber 1230a.

The second master piston 1230 is provided with a second cut-off hole 1230d that communicates with the second master chamber 1230a and communicates with the fifth hydraulic port 1280e and a second reservoir flow path 1720 in a non-operating state, that is, in a ready state before a displacement occurs. In addition, between the outer circumferential surface of the second master piston 1230 and the cylinder body 1210, a fourth sealing member 1290d for blocking the flow of the pressurized medium discharged from the second master chamber 1230a to the second reservoir flow path 1720 connected to the fifth hydraulic port 1280e may be provided. The fourth sealing members 1290d may be seated in an accommodating groove recessed at the front (the left side of FIG. 1) of the fifth hydraulic port 1280e on the inner circumferential surface of the cylinder body 1210 to come into contact with the outer circumferential surface of the second master piston 1230. The fourth sealing member 1290d may be provided in front (the left side of FIG. 1) of the second sealing member 1290b, and may allow a flow in which the pressurized medium is transmitted to the second master chamber 1230a from the second reservoir flow path 1720 connected to the fifth hydraulic port 1280e and block a flow in which the pressurized medium is transmitted to the fifth hydraulic port 1280e and the second reservoir flow path 1720 from the second master chamber 1230a.

The integrated master cylinder 1200 may secure safety when a component element fails by independently including the first master chamber 1220a and the second master chamber 1230a. For example, the first master chamber 1220a may be connected to any two wheel cylinders 21 and 22 of a right front wheel FR, a left front wheel FL, a left rear wheel RL, and a right rear wheel RR through a first backup flow path 1610 to be described below, and the second master chamber 1230a may be connected to the other two wheel cylinders 23 and 24 through a second backup flow path 1620 to be described below, and accordingly, braking of a vehicle may be possible even when a problem such as a leak occurs in any one of the chambers.

The pedal simulator 1240 may be provided between the first master piston 1220 and the second master piston 1230, and provide a pedal feeling of the brake pedal 10 to the driver by its own elastic restoring force. Specifically, the pedal simulator 1240 may be interposed between a front surface of the first master piston 1220 and a rear surface of the second master piston 1230, and may be made of an elastic material that is compressible and expandable such as rubber. The pedal simulator 1240 may include a cylindrical body portion 1241 at least partially inserted and supported on the front surface of the first master piston 1220 and a tapered portion 1242 at least partially inserted and supported on the rear surface of the second master piston 1230 and gradually expanding in diameter toward the front (the left side of FIG. 1). At least a portion of each of both ends of the pedal simulator 1240 may be stably supported by being inserted into the first master piston 1220. Furthermore, by changing an elastic restoring force according to the pressing force of the brake pedal 10 by the tapered portion 1241, a stable and familiar pedal feeling may be provided to the driver.

A simulator valve 1711 may be provided on the first reservoir flow path 1710 to be described below so that a flow of the pressurized medium between the reservoir 1100 and the first master chamber 1220a is controlled. The simulator valve 1711 may be provided as a normal-closed-type solenoid valve that is closed in normal times and operates to open when receiving an electrical signal from the electronic control unit and may be opened in the normal operating mode of the electronic brake system 1000. In addition, a bypass flow path 1730 having one end connected to a front side of the simulator valve 1711 and the other end connected to a rear side of the simulator valve 1711 may be provided on the first reservoir flow path 1710, and a simulator check valve 1731 may be provided in the bypass flow path 1730. That is, the simulator check valve 1731 may be provided in parallel with the simulator valve 1711, and allow a flow of the pressurized medium from the reservoir 1100 toward the first master chamber 1220a and block a flow of the pressurized medium in the opposite direction.

Describing a pedal simulation operation by the integrated master cylinder 1200, in the normal operating mode, at the same time as the driver operates the brake pedal 10, a first cut valve 1611 and a second cut valve 1621 provided on the first backup flow path 1610 and the second backup flow path 1620, which will be described below, are closed, while the simulator valve 1711 of the first reservoir flow path 1710 is opened. As the operation of the brake pedal 10 progresses, the first master piston 1220 moves forward, but as the second cut valve 1621 operates to close, the second master chamber 1230a is sealed and the second master piston 1230 does not generate a displacement. In this case, the pressurized medium accommodated in the first master chamber 1220a is introduced along the first reservoir flow path 1710 by a closing operation of the first cut valve 1611 and an opening operation of the simulator valve 1711. While the second master piston 1230 does not move forward, the first master piston 1220 continues to move forward and thus compresses the pedal simulator 1240, and an elastic restoring force of the pedal simulator 1240 may be provided to the driver as the pedal feeling. Then, when the driver releases the pressing force of the brake pedal 10, the first and second piston springs 1220b and 1230b and the elastic restoring force of the pedal simulator 1240 may cause the first and second master pistons 1220 and 1230 and the pedal simulator 1240 to return to the original shapes and positions, and the first master chamber 1220a may be filled with the pressurized medium supplied from the reservoir 1100 through the first reservoir flow path 1710.

Since the interior of the first master chamber 1220a and the second master chamber 1230a is always filled with the pressurized medium in this way, friction between the first and second master pistons 1220 and 1230 is minimized during the pedal simulation operation, so that durability of the integrated master cylinder 1200 may be improved and introduction of foreign substances from the outside may be blocked as well.

The reservoir 1100 may accommodate and store the pressurized medium therein. The reservoir 1100 may supply or receive the pressurized medium by being connected to each of component elements such as the integrated master cylinder 1200, the hydraulic pressure supply device 1300 to be described below, and hydraulic circuits to be described below. In the drawings, several reservoirs 1100 are shown by the same reference numerals, but this is an example for helping understanding of the invention, and the reservoir 1100 may be provided as a single component or as a plurality of separate and independent components.

The reservoir flow path 1700 is provided to connect the integrated master cylinder 1200 and the reservoir 1100.

The reservoir flow path 1700 may include the first reservoir flow path 1710 connecting the first master chamber 1220a and the reservoir 1100 and the second reservoir flow path 1720 connecting the second master chamber 1230a and the reservoir 1100. To this end, one end of the first reservoir flow path 1710 may communicate with the first master chamber 1220a through the first hydraulic port 1280a of the integrated master cylinder 1200 and the other end thereof may communicate with the reservoir 1100, and one end of the second reservoir flow path 1720 may communicate with the second master chamber 1230a by the fifth hydraulic port 1280e of the integrated master cylinder 1200 and the other end thereof may communicate with the reservoir 1100. In addition, as described above, the first reservoir flow path 1710 may be provided with the simulator valve 1711 operating to open in the normal operating mode so that the flow of the pressurized medium between the reservoir 1100 and the first master chamber 1220a through the first reservoir flow path 1710 is controlled. In addition, the bypass flow path 1730 having one end connected to a front side of the simulator valve 1711 and the other end connected to a rear side of the simulator valve 1711 may be provided on the first reservoir flow path 1710, and the simulator check valve 1731 that allows only the flow of the pressurized medium from the reservoir 1100 to the first master chamber 1220a may be provided in the bypass flow path 1730.

The hydraulic pressure supply device 1300 is provided to receive a driver's willingness to brake as an electrical signal from the pedal displacement sensor 11 for detecting the displacement of the brake pedal 10, and generate hydraulic pressure of the pressurized medium through mechanical operation.

The hydraulic pressure supply device 1300 may include a hydraulic pressure providing unit that provides pressure to the pressurized medium transmitted to the wheel cylinders 20, a motor (not illustrated) that generates a rotational force by an electrical signal from the pedal displacement sensor 11, and a power converter (not illustrated) that converts a rotational motion of the motor into a linear motion and transmits the converted motion to the hydraulic pressure providing unit.

The hydraulic pressure providing unit includes a cylinder block 1310 provided so that the pressurized medium is able to be accommodated, a hydraulic piston 1320 accommodated in the cylinder block 1310, a sealing member 1350 provided between the hydraulic piston 1320 and the cylinder block 1310 to seal pressure chambers 1330 and 1340, and a drive shaft 1390 that transmits power output from the power converter to the hydraulic piston 1320.

The pressure chambers 1330 and 1340 may include a first pressure chamber 1330 positioned at the front of the hydraulic piston 1320 (a left direction of the hydraulic piston 1320 in FIG. 1) and a second pressure chamber 1340 positioned at the rear of the hydraulic piston 1320 (a right direction of the hydraulic piston 1320 in FIG. 1). That is, the first pressure chamber 1330 is provided to be partitioned by the cylinder block 1310 and a front surface of the hydraulic piston 1320 so that a volume thereof is varied according to the movement of the hydraulic piston 1320, and the second pressure chamber 1340 is provided to be partitioned by the cylinder block 1310 and a rear surface of the hydraulic piston 1320 so that a volume thereof is varied according to the movement of the hydraulic piston 1320.

The motor (not illustrated) is provided to generate a driving force of the hydraulic piston 1320 by an electrical signal output from an electronic control unit (ECU). The motor may be provided to include a stator and a rotor and may provide power for generating a displacement of the hydraulic piston 1320 by rotating in a forward or reverse direction through the stator and the rotor. A rotational angular velocity and a rotational angle of the motor may be precisely controlled by a motor control sensor (not illustrated), and the motor control sensor may control operations of the motor and the hydraulic piston 1320 based on a hydraulic pressure value detected by a first pressure sensor PS1 to be described below. Since the motor is a well-known technology, a detailed description thereof will be omitted.

The power converter (not illustrated) is provided to convert the rotational force of the motor into a linear motion. The power converter may be provided in a structure including, for example, a worm shaft (not illustrated), a worm wheel (not illustrated), and the drive shaft 1390. The worm shaft may be integrally formed with a rotating shaft of the motor, and a worm may be formed on an outer circumferential surface of the worm shaft and coupled to engage with the worm wheel to rotate the worm wheel. The worm wheel may be connected to engage with the drive shaft 1390 to linearly move the drive shaft 1390, and the drive shaft 1390 may be connected to the hydraulic piston 1320, through which the hydraulic piston 1320 may be slidably moved in the cylinder block 1310.

Describing the above operations again, when the displacement of the brake pedal 10 is detected by the pedal displacement sensor 11, the detected signal is transmitted to the electronic control unit, and the electronic control unit drives the motor to rotate the worm shaft in one direction. The rotational force of the worm shaft may be transmitted to the drive shaft 1390 through the worm wheel, and the hydraulic piston 1320 connected to the drive shaft 1390 may generate the hydraulic pressure in the first pressure chamber 1330 while moving forward in the cylinder block 1310.

Conversely, when the pressing force of the brake pedal 10 is released, the electronic control unit drives the motor to rotate the worm shaft in an opposite direction. Therefore, the worm wheel may also rotate in the opposite direction, and a negative pressure may be generated in the first pressure chamber 1330 while the hydraulic piston 1320 connected to the drive shaft 1390 moves backward in the cylinder block 1310.

The generation of the hydraulic pressure and the negative pressure in the second pressure chamber 1340 may be implemented by operating in a direction opposite to the above-mentioned one direction. That is, when the displacement of the brake pedal 10 is detected by the pedal displacement sensor 11, the detected signal is transmitted to the electronic control unit, and the electronic control unit drives the motor to rotate the worm shaft in the opposite direction. The rotational force of the worm shaft may be transmitted to the drive shaft 1390 through the worm wheel, and the hydraulic piston 1320 connected to the drive shaft 1390 may generate the hydraulic pressure in the second pressure chamber 1340 while moving backward in the cylinder block 1310.

Conversely, when the pressing force of the brake pedal 10 is released, the electronic control unit drives the motor in the one direction to rotate the worm shaft in the one direction. Therefore, the worm wheel may also reversely rotate, and a negative pressure may be generated in the second pressure chamber 1340 while the hydraulic piston 1320 connected to the drive shaft 1390 moves forward in the cylinder block 1310.

In this way, the hydraulic pressure supply device 1300 may generate the hydraulic pressure or the negative pressure in each of the first pressure chamber 1330 and the second pressure chamber 1340 according to the direction of rotation of the worm shaft by the driving of the motor, and a determination as to whether braking is implemented by transmitting the hydraulic pressure or braking is released using the negative pressure may be made by controlling the valves.

Meanwhile, the power converter according to the first embodiment of the present invention is not limited to any one structure as long as the power converter is able to convert the rotational motion of the motor into the linear motion of the hydraulic piston 1320, and it should be understood in the same way even when the power converter includes devices of various structures and manners.

The hydraulic pressure supply device 1300 may be hydraulically connected to the reservoir 1100 by the dump controller 1800. The dump controller 1800 may include a first dump controller 1810 for controlling the flow of the pressurized medium between the first pressure chamber 1330 and the reservoir 1100 and a second dump controller 1820 for controlling the flow of the pressurized medium between the second pressure chamber 1340 and the reservoir 1100, and the first dump controller 1810 and the second dump controller 1820 may include a plurality of flow paths and various solenoid valves to control the flow of the pressurized medium between the hydraulic pressure supply device 1300 and the reservoir 1100. The second dump controller 1820 may be connected to one end of the inspection flow path 1900 to be described below and transmit the pressurized medium introduced from the inspection flow path 1900 to the reservoir 1100 or transmit the pressurized medium discharged from the second pressure chamber 1340 to the inspection flow path 1900.

The hydraulic pressure control unit 1400 may be provided to control the hydraulic pressure transmitted to each wheel cylinder 20, and the electronic control unit (ECU) is provided to control the hydraulic pressure supply device 1300 and various valves based on hydraulic pressure information and pedal displacement information.

The hydraulic pressure control unit 1400 may be equipped with a first hydraulic circuit 1510 for controlling the flow of the hydraulic pressure transmitted to first and second wheel cylinders 21 and 22 among the four wheel cylinders 20 and a second hydraulic circuit 1520 for controlling the flow of the hydraulic pressure transmitted to third and fourth wheel cylinders 23 and 24 and includes a plurality of flow paths and valves to control the hydraulic pressure transmitted from the hydraulic pressure supply device 1300 to the wheel cylinders 20.

The hydraulic pressure control unit 1400 may regulate and control the hydraulic pressure in the first pressure chamber 1330 generated by the forward movement of the hydraulic piston 1320 or the hydraulic pressure in the second pressure chamber 134 generated by the backward movement of the hydraulic piston 1320 and provide the pressurized medium to the first hydraulic circuit 1510 and the second hydraulic circuit 1520. In addition, the hydraulic pressure control unit 1400 may recover the pressurized medium provided to the first hydraulic circuit 1510 and the second hydraulic circuit 1520 through the negative pressure in the first pressure chamber 1330 generated by the backward movement of the hydraulic piston 1320 or the negative pressure in the second pressure chamber 134 generated by the forward movement of the hydraulic piston 1320.

The first hydraulic circuit 1510 may control the hydraulic pressure applied to the first and second wheel cylinders 21 and 22, which are two of the wheel cylinders 20 among the four wheels RR, RL, FR, and FL and the second hydraulic circuit 1520 may control the hydraulic pressure applied to the third and fourth wheel cylinders 23 and 24, which are the other two wheel cylinders 20.

The first hydraulic circuit 1510 may be provided by being branched into two flow paths connected to the first wheel cylinder 21 and the second wheel cylinder 22 to supply the hydraulic pressure provided from the hydraulic pressure supply device 1300 through the hydraulic pressure control unit 1400 to the first wheel cylinder 21 and the second wheel cylinder 22. Similarly, the second hydraulic circuit 1520 may be provided by being branched into two flow paths connected to the third wheel cylinder 24 and the fourth wheel cylinder 24 to supply the hydraulic pressure provided from the hydraulic pressure supply device 1300 through the hydraulic pressure control unit 1400 to the third wheel cylinder 23 and the fourth wheel cylinder 24.

The first and second hydraulic circuits 1510 and 1520 may include first to fourth inlet valves 1511a, 1511b, 1521a, and 1521b to control the flow and hydraulic pressure of the pressurized medium transmitted to the first to fourth wheel cylinders 21, 22, 23, and 24, respectively. The first to fourth inlet valves 1511a, 1511b, 1521a, and 1521b may be disposed upstream of the first to fourth wheel cylinders 21, 22, 23, and 24, respectively, and provided as normal-open-type solenoid valves that are open in normal times and operate to close when an electrical signal is received from the electronic control unit.

The first inlet valve 1511a and the second inlet valve 1511b may be controlled to be in an open state in an inspection mode to be described below. When the hydraulic pressure of the hydraulic pressure supply device 1300 for performing the inspection mode is generated, it is required to expand a volume in which the pressurized medium is accommodated to perform detailed control of the motor (not illustrated) even at a low target pressure. Therefore, in a first inspection mode of the electronic brake system 1000 to be described below, at least one of the first inlet valve 1511a or the second inlet valve 1511b may be controlled to be in the open state to increase a volume of the pressurized medium provided from the hydraulic pressure supply device 1300. On the other hand, by controlling the third inlet valve 1521a and the fourth inlet valve 1521b to be closed in the first inspection mode, the hydraulic pressure provided from the hydraulic pressure supply device 1300 may be prevented from leaking toward the second backup flow path 1620, thereby making it possible to promote the speed and accuracy of the inspection mode. A more detailed description thereof will be given below.

The first and second hydraulic circuits 1510 and 1520 may include first to fourth check valves 1513a, 1513b, 1523a, and 1523b provided to be connected in parallel to the first to fourth inlet valves 1511a, 1511b, 1521a, and 1521b. The check valves 1513a, 1513b, 1523a, and 1523b may be provided in the bypass flow path connecting the front and rear sides of the first to fourth inlet valves 1511a, 1511b, 1521a, and 1521b on the first and second hydraulic circuits 1510 and 1520 and allow only a flow of the pressurized medium from the respective wheel cylinders 20 to the hydraulic pressure supply device 1300 or the hydraulic pressure control unit 1400, and block a flow of the pressurized medium from the hydraulic pressure supply device 1300 or the hydraulic pressure control unit 1400 to the wheel cylinders 20. The hydraulic pressure of the pressurized medium applied to the respective wheel cylinders 20 may be quickly removed by the first to fourth check valves 1513a, 1513b, 1523a, and 1523b, and even when the first to fourth inlet valves 1511a, 1511b, 1521a, and 1521b do not operate normally, the hydraulic pressure of the pressurized medium applied to the wheel cylinders 20 may be smoothly recovered to the hydraulic pressure supply device 1300.

The second hydraulic circuit 1520 may be provided with first and second outlet valves 1522a and 1522b for controlling a flow of the pressurized medium discharged from the third and fourth wheel cylinders 23 and 24 for improving performance when braking of the third and fourth wheel cylinders 23 and 24 is released. The first and first outlet valves 1522a and 1522b are provided on discharge sides of the third and fourth wheel cylinders 23 and 24, respectively, and control a flow of the pressurized medium transmitted from the third and fourth wheel cylinders 23 and 24 to the reservoir 1100. The first and second outlet valves 1522a and 1522b may be provided as normal-closed-type solenoid valves that are closed in normal times and operate to open when receiving an electrical signal from the electronic control unit. The first and second outlet valves 1512a and 1512b may selectively release the hydraulic pressure of the pressurized medium applied to the third wheel cylinder 23 and the fourth wheel cylinder 22 in an ABS braking mode of the vehicle and transmit the released hydraulic pressure to the reservoir 1100.

The first backup flow path 1610 to be described below may be branched and connected to the first and second wheel cylinders 21 and 22 of the first hydraulic circuit 1510, and at least one first cut valve 1611 may be provided on the first backup flow path 1610 to control a flow of the pressurized medium between the first and second wheel cylinders 22 and 22 and the integrated master cylinder 1200.

The electronic brake system 1000 according to the first embodiment of the present invention may include the first and second backup flow paths 1610 and 1620 to implement braking by directly supplying the pressurized medium discharged from the integrated master cylinder 1200 to the wheel cylinders 20 when normal operation is not possible due to device failure. A mode in which the hydraulic pressure of the integrated master cylinder 1200 is directly transmitted to the wheel cylinders 20 is referred to as an abnormal operating mode, that is, a fallback mode.

The first backup flow path 1610 may be provided to connect the first master chamber 1220a of the integrated master cylinder 1200 and the first hydraulic circuit 1510, and the second backup flow path 1620 may be provided to connect the second master chamber 1230a of the integrated master cylinder 1200 and the second hydraulic circuit 1520.

The first backup flow path 1610 may have one end connected to the first master chamber 1220a and the other end branched and connected to downstream sides of the first and second inlet valves 1511a and 1511b on the first hydraulic circuit 1510, and the second backup flow path 1620 may have one end connected to the second master chamber 1230a and the other end connected between the third inlet valve 1521a and the first outlet valve 1522a on the second hydraulic circuit 1520. In FIG. 1, the second backup flow path 1620 is illustrated as being connected between the third inlet valve 1521a and the first outlet valve 1522a, but the same should be understood when the second backup flow path 1620 is branched and connected to at least one of upstream sides of the first outlet valve 1522a and the second outlet valve 1522b.

At least one first cut valve 1611 for controlling the flow of the pressurized medium in both directions may be provided on the first backup flow path 1610, and the second cut valve 1621 for controlling the flow of the pressurized medium in both directions may be provided in the second backup flow path 1620. The first cut valve 1611 and the second cut valve 1621 may be provided as normal-open-type solenoid valves that are open in normal times and operate to close when receiving a closing signal from the electronic control unit.

As illustrated in FIG. 1, a pair of first cut valves 1611 may be provided on the first and second wheel cylinders 21 and 22, respectively, and as will be described below, the hydraulic pressure of the pressurized medium applied to the first wheel cylinder 21 and the second wheel cylinder 22 in an inspection preparation mode or the ABS braking mode of the vehicle may be selectively released, and the released hydraulic pressure may be discharged to the reservoir 1100 through the first backup flow path 1610, the first master chamber 1220a, the second branch flow path 1920 to be described below, the inspection flow path 1900, and the second dump controller 1820. A more detailed description thereof will be given below.

When the first and second cut valves 1611 and 1621 are closed, the pressurized medium of the integrated master cylinder 1200 may be prevented from being directly transmitted to the wheel cylinders 20, and at the same time, the hydraulic pressure provided from the hydraulic pressure supply device 1300 may be prevented from leaking toward the integrated master cylinder 1200. In addition, when the first and second cut valves 1611 and 1621 are opened, the pressurized medium pressurized in the integrated master cylinder 1200 may be directly supplied to the first and second hydraulic circuits 1510 and 1520 through the first and second backup flow paths 1610 and 1620 to implement braking.

The inspection flow path 1900 is provided to connect the integrated master cylinder 1200 and the dump controller 1800, and is provided to inspect whether or not there is a leak in various component elements mounted in the integrated master cylinder 1200 and the simulator valve 1711.

The inspection flow path 1900 may have one end connected to the second dump controller 1820 and the other end connected to the first master chamber 1220a, where the other end may be branched into the first branch flow path 1910 and the second branch flow path 1920 that are connected to the third hydraulic port 1280c and the fourth hydraulic port 1280d, respectively. An inspection valve 1901 for controlling the flow of the pressurized medium in both directions may be provided at the one end of the inspection flow path 1900, a first inspection check valve 1911 that allows only the flow of the pressurized medium from the second dump controller 1820 toward the first master chamber 1220a and blocks the flow of the pressurized medium in the opposite direction may be provided on the first branch flow path 1910, and a second inspection check valve 1921 that allows only the flow of the pressurized medium from the first master chamber 1220a toward the second dump controller 1820 and blocks the flow of the pressurized medium in the opposite direction may be provided on the second branch flow path 1920. The inspection valve 1901 may be provided as a normal-open-type solenoid valve that is open in normal times and operates to close when receiving an electrical signal from the electronic control unit. The inspection valve 1901 may be controlled to be in the closed state in the first inspection mode of the electronic brake system 1000 and be in the open state in a second inspection mode.

The electronic brake system 1000 may include the first pressure sensor PS1 for detecting the hydraulic pressure of the pressurized medium provided by the hydraulic pressure supply device 1300 and a second pressure sensor PS2 for detecting the hydraulic pressure of the second master chamber 1230a. The first pressure sensor PS1 may be provided at the side of the first hydraulic circuit 1510 to detect the hydraulic pressure of the pressurized medium generated by and provided from the hydraulic pressure supply device 1300 in the inspection mode and transmitted to the first hydraulic circuit 1510, and the second pressure sensor PS2 may be provided between the second master chamber 1230a and the second cut valve 1621 in the second backup flow path 1620 to detect the hydraulic pressure of the pressurized medium accommodated in the second master chamber 1230a. In the first inspection mode to be described below, information on pressure values of the pressurized medium detected by the first pressure sensor PS1 and the second pressure sensor PS2 may be transmitted to the electronic control unit, and the electronic control unit may determine whether or not there is a leak in the integrated master cylinder 1200 or the simulator valve 1711 by comparing the hydraulic pressure value detected by the first pressure sensor PS1 and the hydraulic pressure value detected by the second pressure sensor PS2. In addition, the electronic brake system 1000 may include a stroke sensor (not illustrated) for measuring the displacement amount of the hydraulic piston 1320 of the hydraulic pressure supply device 1300, and the stroke sensor may inspect whether or not there is a leak in the integrated master cylinder 1200 based on displacement information about the hydraulic piston 1320 in the second inspection mode to be described below. A detailed description thereof will be described below with reference to FIGS. 4 and 5.

Hereinafter, an operating method of the electronic brake system 1000 according to the first embodiment of the present invention will be described.

The electronic brake system 1000 according to the first embodiment of the present invention may include the inspection preparation mode, and the first inspection mode and the second inspection mode for inspecting whether or not there is a leak in the integrated master cylinder 1200 or the simulator valve 1711.

First, the inspection preparation mode corresponding to a preparation operation before performing the inspection mode of the electronic brake system 1000 according to the first embodiment of the present invention will be described.

Figure 3:
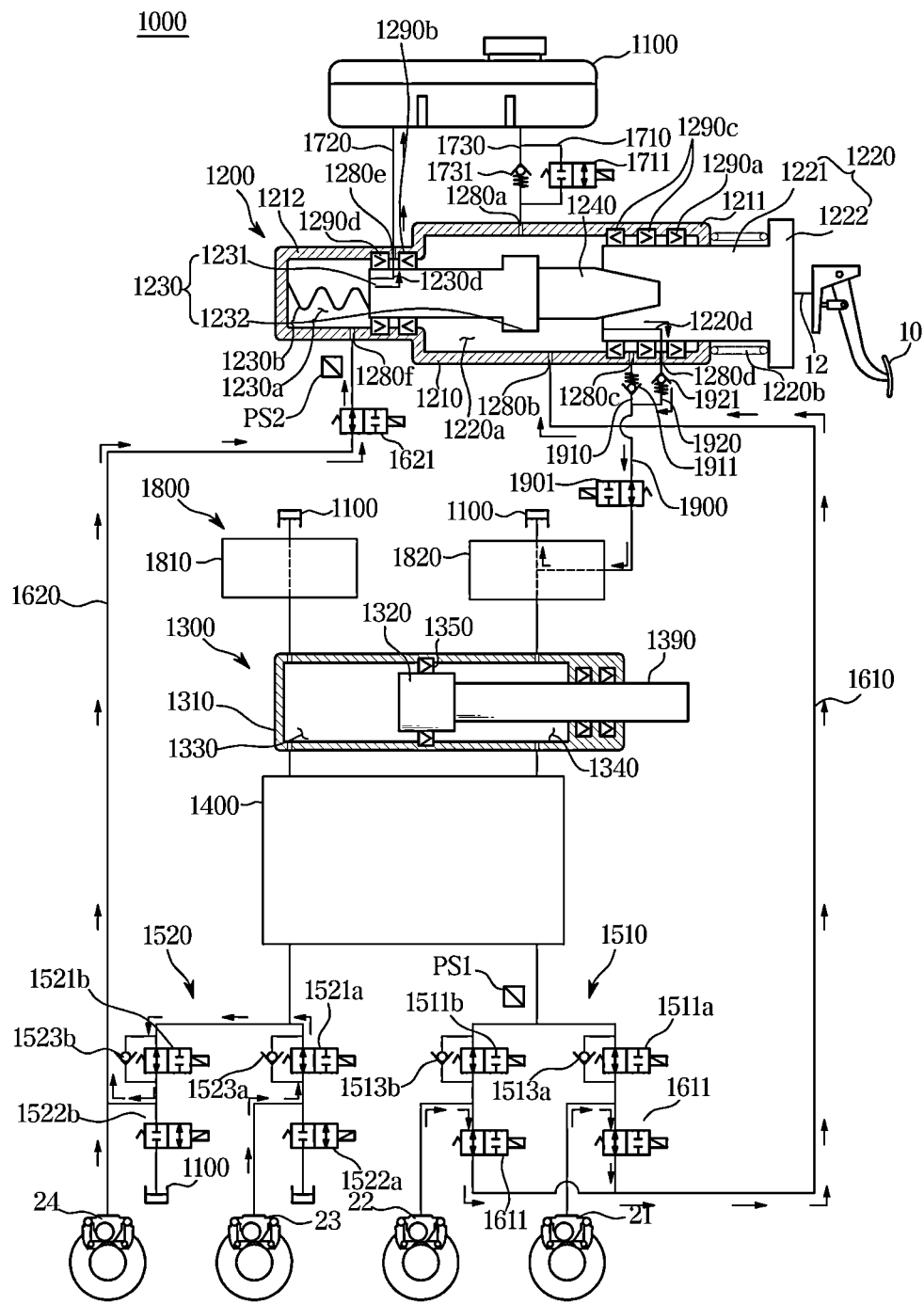
FIG. 3 is a hydraulic circuit diagram illustrating a state in which the electronic brake system according to the first embodiment of the present invention performs an inspection preparation mode.

FIG. 3 is a hydraulic circuit diagram illustrating a state in which the electronic brake system 1000 according to the first embodiment of the present invention performs an inspection preparation mode. Referring to FIG. 3, before inspecting whether or not there is a leak in the integrated master cylinder 1200 or the simulator valve 1711, the inspection preparation mode may be performed in advance to improve the accuracy of the inspection.

In the inspection preparation mode, the electronic control unit may discharge the pressurized medium applied to the first and second wheel cylinders 21 and 22 to the reservoir 1100 by opening the first cut valve 1611 and the inspection valve 1901 and controlling the second dump controller 1820 so that the inspection flow path 1900 and the reservoir 1100 are hydraulically connected. Specifically, by opening the first cut valve 1611 and the inspection valve 1901, the pressurized medium applied to the first and second wheel cylinders 21 and 22 may be discharged to the reservoir 1100 by sequentially passing through the first backup flow path 1610, the first master chamber 1220a, the first cut-off hole 1220d, the second branch flow path 1920, and the second dump controller 1820.

Similarly, the electronic control unit may open the second cut valve 1621 to discharge the pressurized medium applied to the third and fourth wheel cylinders 23 and 24 to the reservoir 1100. By opening the second cut valve 1621, the pressurized medium applied to the third and fourth wheel cylinders 23 and 24 may be discharged to the reservoir 1100 by sequentially passing through the second backup flow path 1620, the second master chamber 1230*a*, and the second cut-off hole 1230*d*, and the second reservoir flow path 1720.

By removing the hydraulic pressure of the pressurized medium applied to the first to fourth wheel cylinders 21, 22, 23, and 24 by the inspection preparation mode, and setting the electronic brake system 1000 to an initial state, the accuracy of the first and second inspection modes to be described below may be promoted.

After performing the inspection preparation mode, the electronic control unit may enter the first inspection mode to inspect whether or not there is a leak in the integrated master cylinder 1200 and the simulator valve 1711.

Figure 4:
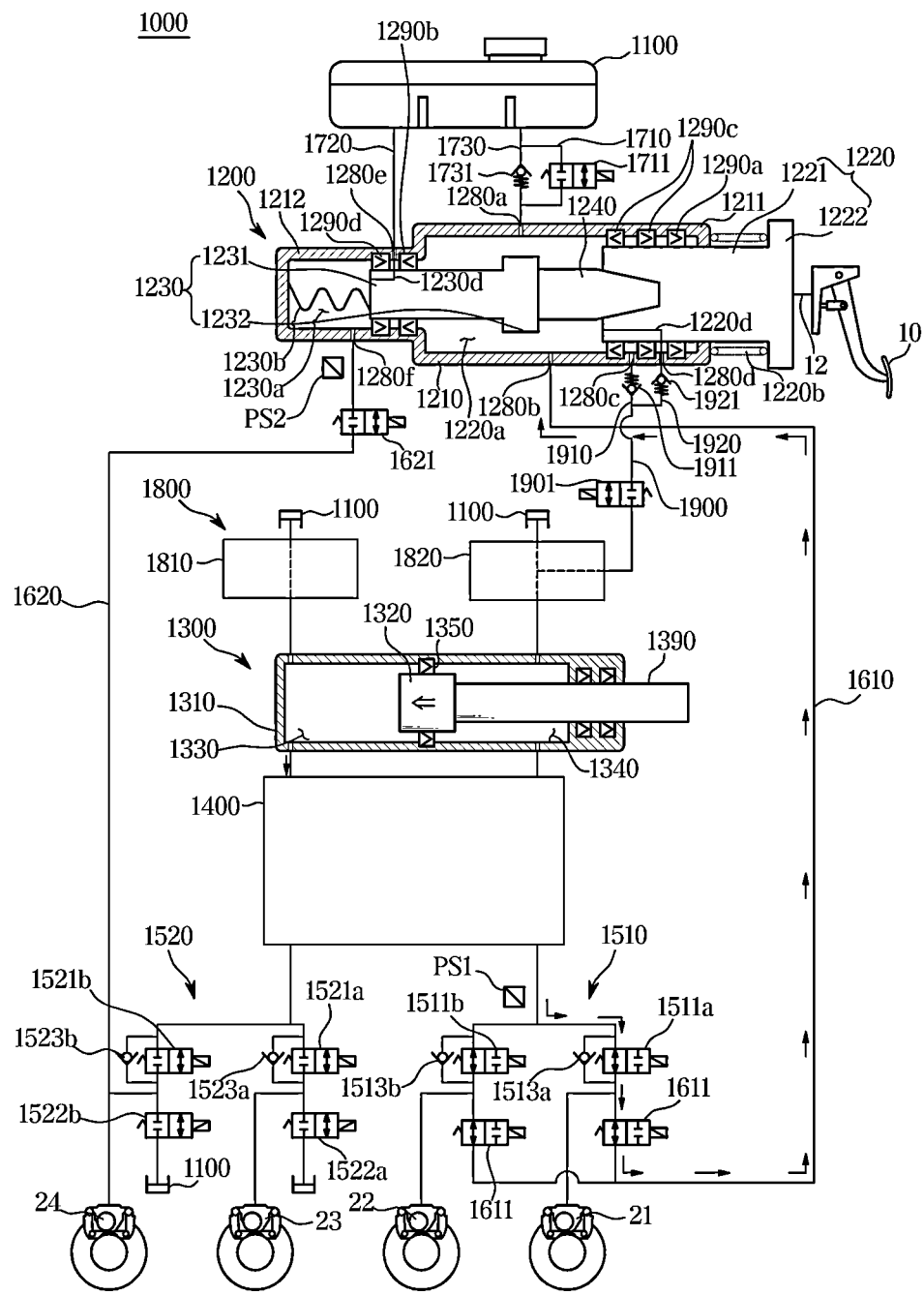
FIG. 4 is a hydraulic circuit diagram illustrating a state in which the electronic brake system according to the first embodiment of the present invention performs a first inspection mode.

FIG. 4 is a hydraulic circuit diagram illustrating a state in which the electronic brake system 1000 according to the first embodiment of the present invention performs the first inspection mode. Referring to FIG. 4, the electronic control unit operates a motor to move the hydraulic piston 1320 forward and generate hydraulic pressure in the first pressure chamber 1330. At the same time, the simulator valve 1711, the inspection valve 1901, the third and fourth inlet valves 1521*a* and 1521*b*, and the second cut valve 1621 are closed, and the first and second inlet valves 1511*a* and 1511*b* and the first cut valve 1611 are opened. Thereby, the hydraulic pressure generated in the first pressure chamber 1330 is introduced into the first master chamber 1220*a* by sequentially passing through the hydraulic pressure control unit 1400, the first and second inlet valves 1511*a* and 1511*b* of the first hydraulic circuit 1510, and the first backup flow path 1610. At this time, since the second cut valve 1621 is put into the closed state, the second master chamber 1230*a* is sealed.

In this state, the electronic control unit may inspect whether or not there is a leak in the integrated master cylinder 1200 and the simulator valve 1711 by comparing the pressure value measured by the first pressure sensor PS1 and the pressure value measured by the second pressure sensor PS2. Specifically, when there is no leak in the component elements mounted in the integrated master cylinder 1200 and the simulator valve 1711, as soon as the hydraulic pressure value of the hydraulic pressure supply device 1300 measured by the first pressure sensor PS1 reaches a target pressure, the corresponding hydraulic pressure may be introduced into the first master chamber 1220*a* through the first backup flow path 1610 and pressurize the second master piston 1230 forward, so that the hydraulic pressure value of the second master chamber 1230*a* detected by the second pressure sensor PS2 and the first hydraulic pressure values detected by the pressure sensor PS1 may be synchronized with each other. When the hydraulic pressure value detected by the first pressure sensor PS1 and the hydraulic pressure value detected by the second pressure sensor PS2 are synchronized for a predetermined period of time, the electronic control unit may determine that the hydraulic pressure value is in a normal state and end the first inspection mode.

In contrast, when the hydraulic pressure value measured by the second pressure sensor PS2 is lower than the hydraulic pressure value measured by the first pressure sensor PS1, it may be determined that there is a leak in the integrated master cylinder 1200 and the simulator valve 1711. Specifically, when the hydraulic pressure value of the pressurized medium pressurized by the hydraulic pressure supply device 1300, which is measured by the first pressure sensor PS1, reaches the target pressure and then the corresponding hydraulic pressure is maintained for a certain period of time, but the hydraulic pressure value of the second master chamber 1220*a* detected by the second pressure sensor PS2 is lower than the hydraulic pressure value detected by the first pressure sensor PS1 or the hydraulic pressure value detected by the first pressure sensor PS1 also gradually decreases, the electronic control unit may consider that the hydraulic pressure of the second master chamber 1230*a* does not reach the target pressure due to the presence of a leak in the integrated master cylinder 1200 and the simulator valve 1711 and determine that the hydraulic pressure value is in an abnormal state.

As such, the electronic brake system 1000 according to the first embodiment of the present invention may determine whether or not various component elements provided in the integrated master cylinder 1200, specifically, the first sealing member 1290*a*, the second sealing member 1290*b*, the fourth sealing member 1290*d*, the first inspection check valve 1911, and the like, are normal through the first inspection mode and may also determine whether or not the simulator valve 1711 and the simulator check valve 1731 are normal. Furthermore, the electronic brake system 1000 may also determine whether or not peripheral component elements connected to the integrated master cylinder 1200, such as the second cut valve 1621 and the like, are normal.

When it is determined that there is a leak in the component elements of the integrated master cylinder 1200 or the simulator valve 1711 as a result of the first inspection mode, the electronic control unit may inform the driver of the abnormal state through a display or a warning sound and guide the driver to restrict the operation of the vehicle.

When it is determined that there is no abnormality in the first inspection mode as the result of performing the first inspection mode, the electronic control unit may enter the second inspection mode.

Figure 5:
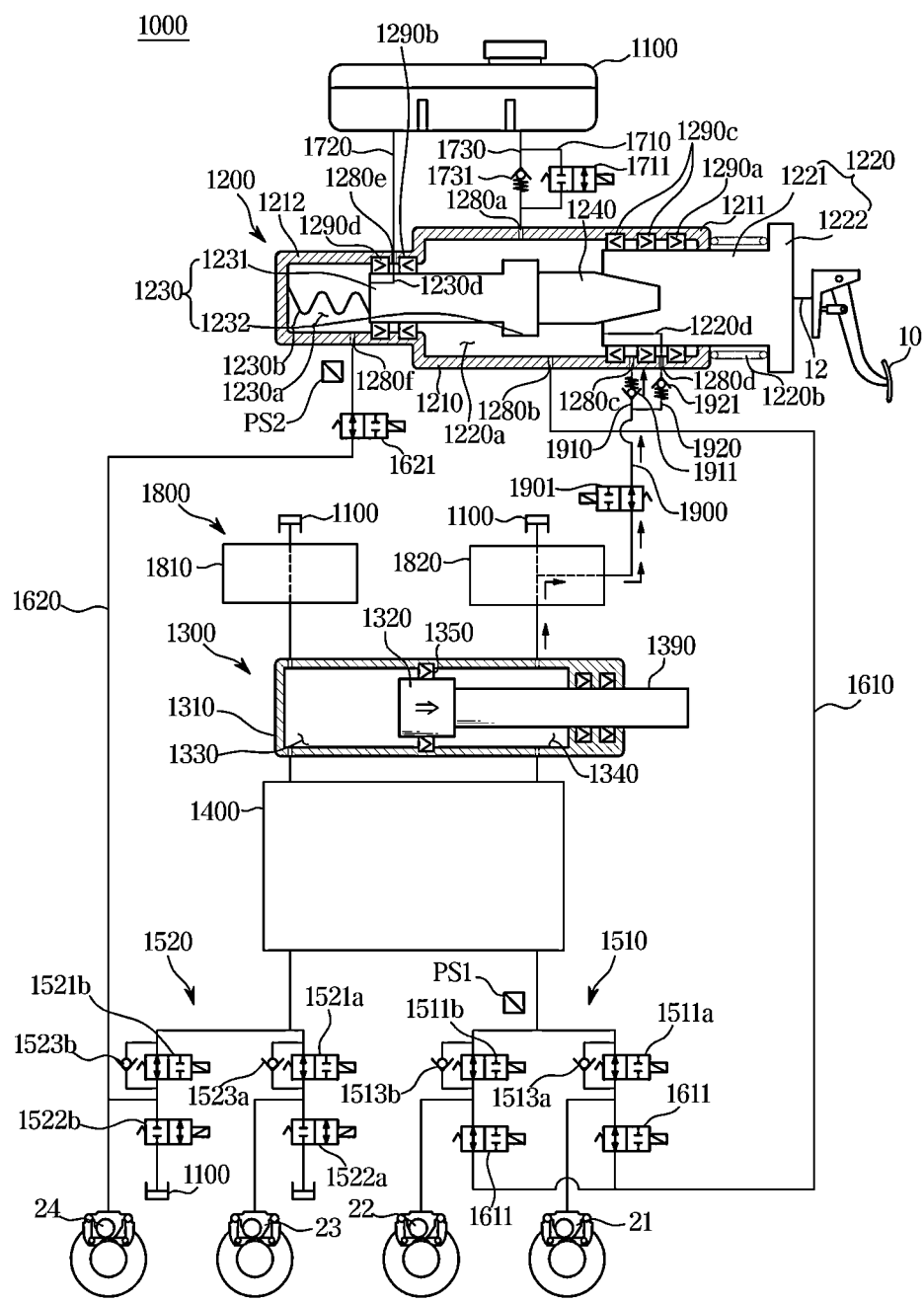
FIG. 5 is a hydraulic circuit diagram illustrating a state in which the electronic brake system according to the first embodiment of the present invention performs a second inspection mode.

FIG. 5 is a hydraulic circuit diagram illustrating a state in which the electronic brake system 1000 according to the first embodiment of the present invention performs the second inspection mode. Referring to FIG. 5, the electronic control unit operates a motor to move the hydraulic piston 1320 backward and generate hydraulic pressure in the second pressure chamber 1340. At the same time, the second dump controller 1820 may block a hydraulic connection between the second pressure chamber 1340 and the reservoir 1100 and allow a hydraulic connection between the second pressure chamber 1340 and the inspection flow path 1900, and the inspection valve 1901 is opened. In this way, the hydraulic pressure generated in the second pressure chamber 1340 is transmitted to the third hydraulic port 1280*c* by sequentially passing through the second dump controller 1820, the inspection flow path 1900, and the first branch flow path 1920. In this case, the first inspection check valve 1921 may allow the flow of the pressurized medium from the second dump controller 1820 toward the first master chamber 1120*a* and thus the pressurized medium may be stably transmitted toward the third hydraulic port 1280*c*.

The third sealing member 1290*c* may be provided to block the flow of the pressurized medium from the first branch flow path 1920 toward the first master chamber 1220*a*, and thus when the third sealing member 1290*c* corresponds to the normal state, as the third hydraulic port 1280*c* is closed, it is not possible to generate hydraulic pressure in the second pressure chamber 1340 any more after the hydraulic piston 1320 moves backward by a predetermined displacement amount.

Therefore, when the displacement amount of the hydraulic piston measured by the stroke sensor (not illustrated) falls within a certain range, the electronic control unit may determine that the third sealing member 1290c is in the normal state and end the second inspection mode. In contrast, when the displacement amount of the hydraulic piston measured by the stroke sensor (not illustrated) exceeds the certain range or gradually increases, the electronic control unit may consider that there is a leak in the third sealing member 1290c, determine that the third sealing member 1290c is in the abnormal state, notify the driver through a display or a warning sound, and guide the driver to restrict the operation of the vehicle.

Hereinafter, an electronic brake system 2000 according to a second embodiment of the present invention will be described.

The description of the electronic brake system 2000 according to the second embodiment of the present invention to be described below is the same as that of the electronic brake system 1000 according to the first embodiment described above, except for parts to be denoted by separate reference numbers and additionally described, and thus descriptions of the same parts will be omitted to avoid duplication of content.

Figure 6:
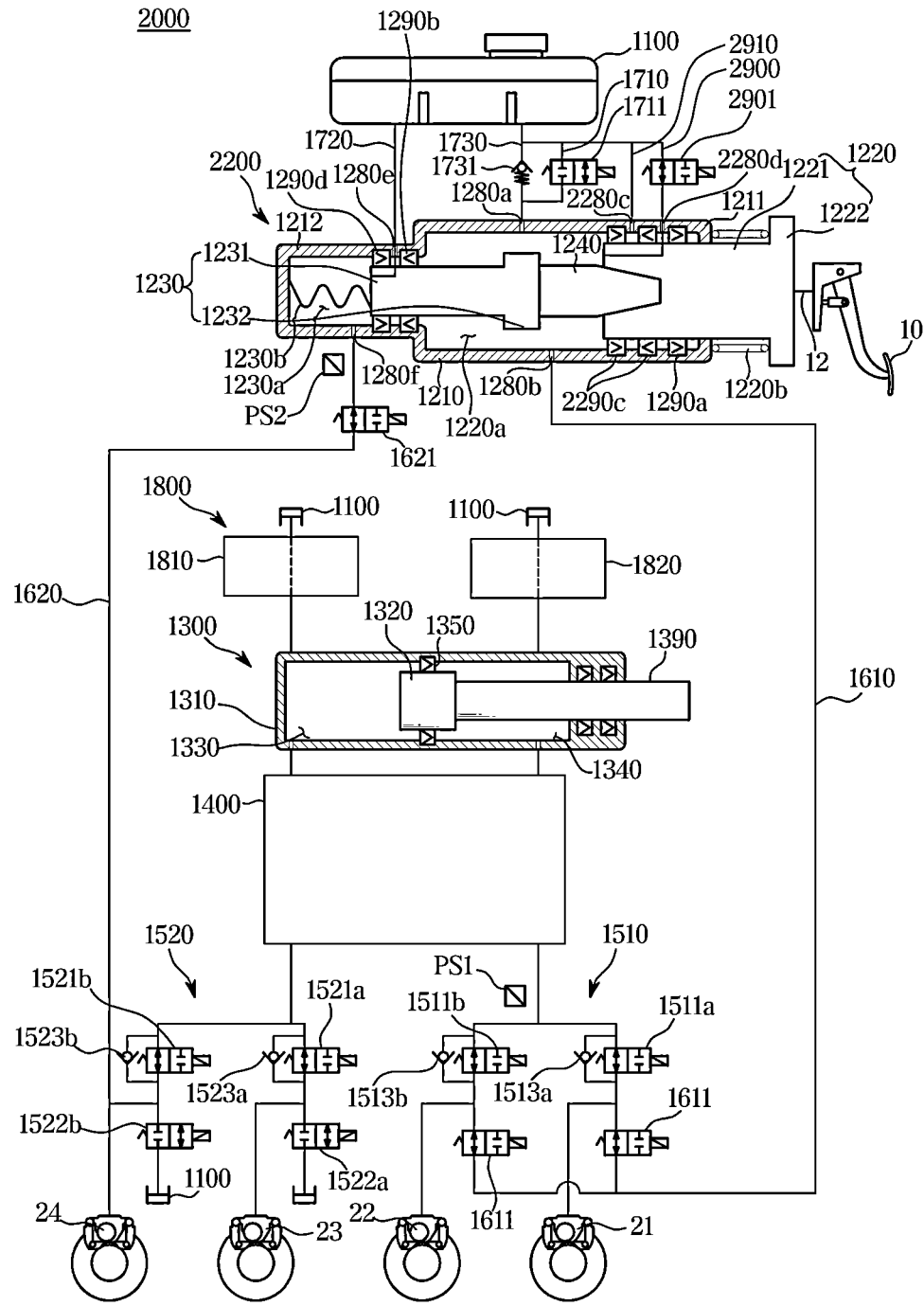
FIG. 6 is a hydraulic circuit diagram illustrating an electronic brake system according to a second embodiment of the present invention.

FIG. 6 is a hydraulic circuit diagram illustrating the electronic brake system 2000 according to the second embodiment of the present invention.

Referring to FIG. 6, the electronic brake system 2000 according to the second embodiment of the present invention includes a reservoir 1100 in which a pressurized medium is stored, an integrated master cylinder 2200 that provides a reaction force of a brake pedal 10 to a pressing force to a driver, and at the same time, pressurizes and discharges a pressurized medium, such as brake oil, stored therein, a hydraulic pressure supply device 1300 that generates hydraulic pressure of the pressurized medium through mechanical operation by receiving a driver's willingness to brake as an electrical signal by a pedal displacement sensor 11 for detecting a displacement of the brake pedal 10, a hydraulic pressure control unit 1400 for controlling the hydraulic pressure provided by the hydraulic pressure supply device 1300, hydraulic circuits 1510 and 1520 equipped with wheel cylinders 20 for braking respective wheels RR, RL, FR, and FL as the hydraulic pressure of the pressurized medium is transmitted, a dump controller 1800 provided between the hydraulic pressure supply device 1300 and the reservoir 1100 to control a flow of the pressurized medium, backup flow paths 1610 and 1620 for hydraulically connecting the integrated master cylinder 2200 and the hydraulic circuits 1510 and 1520, a reservoir flow path 1700 for hydraulically connecting the reservoir 1100 and the integrated master cylinder 2200, an inspection flow path 2900 connected to a master chamber of the integrated master cylinder 2200, and an electronic control unit (ECU) (not illustrated) for controlling the hydraulic pressure supply device 1300 and various valves based on hydraulic pressure information and pedal displacement information.

The integrated master cylinder 2200 is provided to provide a stable pedal feeling by providing a reaction force against a pressing force to the driver when the driver applies the pressing force to the brake pedal 10 for braking operation and pressurize and discharge the pressurized medium accommodated therein by the operation of the brake pedal 10.

Figure 7:
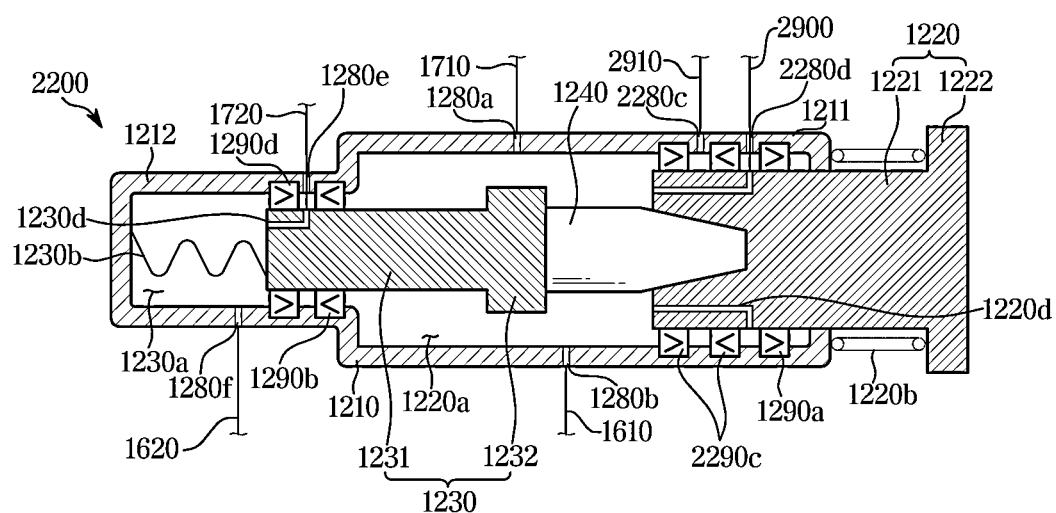
FIG. 7 is an enlarged view of part B of FIG. 6.

FIG. 7 is an enlarged view of part B of FIG. 6, and referring to FIGS. 6 and 7, in the integrated master cylinder 2200, a simulation part for providing a pedal feeling to the driver and a master cylinder part for pressurizing and discharging the pressurized medium accommodated therein by the pressing force of the brake pedal may be coaxially disposed in one cylinder body 1210.

The pressurized medium may be introduced into and discharged from the first master chamber 1220a through a first hydraulic port 1280a, a second hydraulic port 1280b, a third hydraulic port 2280c, and a fourth hydraulic port 2280d. The first hydraulic port 1280a may be connected to a first reservoir flow path 1710 to be described below so that the pressurized medium is introduced into the first master chamber 1220a from the reservoir 1100, or the pressurized medium accommodated in the first master chamber 1220a is discharged to the reservoir 1100, and the second hydraulic port 1280b may be connected to the first backup flow path 1610 to be described below so that the pressurized medium is discharged into the first backup flow path 1610 from the first master chamber 1220a or conversely, the pressurized medium is introduced into the first master chamber 1220a from the first backup flow path 1610.

The first master chamber 1220a is connected to an auxiliary inspection flow path 2910 to be described below through the third hydraulic port 2280c, so that the pressurized medium may be introduced into the first master chamber 1220a from the reservoir 1100 through the auxiliary inspection flow path 2910. In addition, the first master chamber 1220a is connected to the inspection flow path 2900 to be described below through the fourth hydraulic port 2280d, so that the pressurized medium accommodated in the first master chamber 1220a may be discharged into the inspection flow path 2900 or the pressurized medium is introduced into the first master chamber 1220a from the inspection flow path 2900.

The first master piston 1220 is provided with a first cut-off hole 1220d that communicates with the first master chamber 1220a, and at the same time, communicates with the fourth hydraulic port 2280d and the inspection flow path 2900 in a non-operating state, that is, in a ready state before a displacement occurs. In addition, a first sealing member 1290a for sealing the first master chamber 1220a from the outside may be provided between an outer circumferential surface of the first master piston 1220 and the cylinder body 1210. The first sealing member 1290a may be provided to be seated in an accommodating groove recessed in an inner circumferential surface of the cylinder body 1210 to come into contact with the outer circumferential surface of the first master piston 1220, and by the first sealing member 1290a, the pressurized medium accommodated in the first master chamber 1220a may be prevented from leaking to the outside and foreign substances may be prevented from being introduced into the first master chamber 1220a. The first sealing member 1290a may be provided on an outermost side on the inner circumferential surface of the cylinder body 1210, that is, the rear side (the right side of FIG. 6) of the fourth hydraulic port 2280d to which the inspection flow path 2900 to be described below is connected.

A third sealing member 2290c that allows only a flow of the pressurized medium introduced into the first master chamber 1220a from the auxiliary inspection flow path 2910 connected to the third hydraulic port 2280c and blocks a flow of the pressurized medium discharged from the first master chamber 1220a to the auxiliary inspection flow path 2910 may be provided between the outer circumferential surface of the first master piston 1220 and the cylinder body 1210. The third sealing members 2290c may be respectively seated in a pair of accommodating grooves recessed at the front and rear of the third hydraulic port 2280c, respectively, on the inner circumferential surface of the cylinder body 1210 to come into contact with the outer circumferential surface of the first master piston 1220. A pair of third sealing members 2290c may be provided at the front (the left side of FIG. 1) of the first sealing member 1290a, and may allow a flow of the pressurized medium introduced into the first master chamber 1220a from the auxiliary inspection flow path 2910 but block a flow in which the pressurized medium accommodated in the first master chamber 1220a is transmitted to the auxiliary inspection flow path 2910 through the third hydraulic port 2280c.

The inspection flow path 2900 is provided to connect the integrated master cylinder 2200 and the reservoir 1100, and is provided to inspect whether or not there is a leak in various component elements mounted in the integrated master cylinder 1200 and the simulator valve 1711.

The inspection flow path 2900 may have one end connected to the reservoir 1100 and the other end connected to the fourth hydraulic port 2280d of the first master chamber 1220a. An inspection valve 2901 for controlling the flow of the pressurized medium in both directions may be provided on the inspection flow path 2900, and the inspection valve 2901 may be provided as a normal-open-type solenoid valve that is open in normal times and operates to close when receiving an electrical signal from the electronic control unit. The inspection valve 2901 may be controlled to be in a closed state in an inspection mode of the electronic brake system 2000. In addition, the auxiliary inspection flow path 2910 may have one end connected to the reservoir 1100 and the other end connected to the third hydraulic port 2290c of the first master chamber 1220a to assist the flow of the pressurized medium.

Hereinafter, an operating method of the electronic brake system 2000 according to the second embodiment of the present invention will be described.

The electronic brake system 2000 according to the second embodiment of the present invention may include the inspection preparation mode and the inspection mode for inspecting whether or not there is a leak in the integrated master cylinder 2200 or the simulator valve 1711.

First, the inspection preparation mode corresponding to a preparation operation before performing the inspection mode of the electronic brake system 2000 according to the second embodiment of the present invention will be described.

Figure 8:
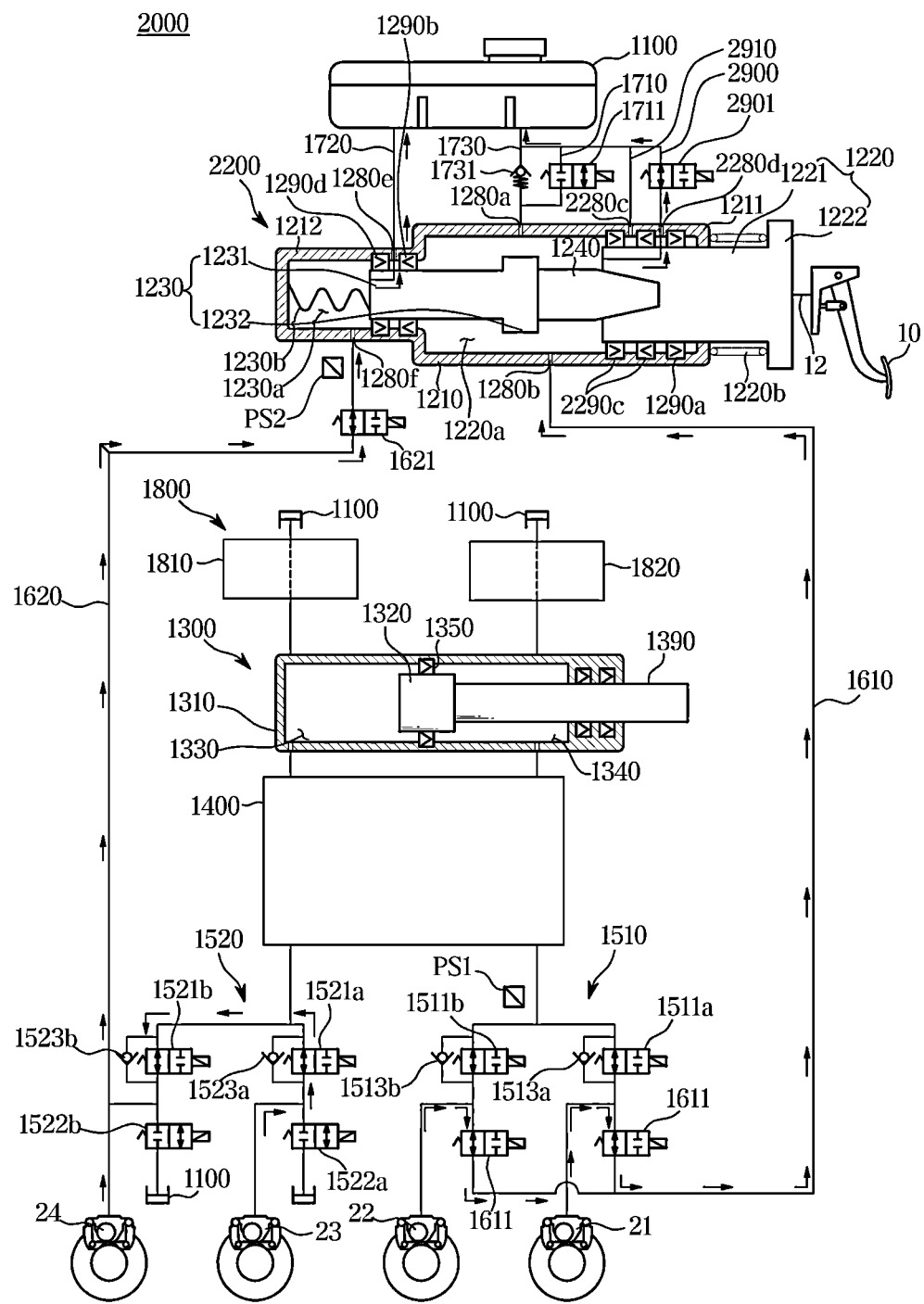
FIG. 8 is a hydraulic circuit diagram illustrating a state in which the electronic brake system according to the second embodiment of the present invention performs an inspection preparation mode.

FIG. 8 is a hydraulic circuit diagram illustrating a state in which the electronic brake system 2000 according to the second embodiment of the present invention performs an inspection preparation mode. Referring to FIG. 8, before inspecting whether or not there is a leak in the integrated master cylinder 2200 or the simulator valve 1711, the electronic control unit may perform the inspection preparation mode in advance to improve the accuracy of the inspection.

In the inspection preparation mode, the electronic control unit may discharge the pressurized medium applied to the first and second wheel cylinders 21 and 22 to the reservoir 1100 by opening a first cut valve 1611 and the inspection valve 2901 and controlling the second dump controller 1820 so that the inspection flow path 2900 and the reservoir 1100 are hydraulically connected. Specifically, by opening the first cut valve 1611 and the inspection valve 2901, the pressurized medium applied to the first and second wheel cylinders 21 and 22 may be discharged to the reservoir 1100 by sequentially passing through the first backup flow path 1610, the first master chamber 1220a, the first cut-off hole 1220d, and the inspection flow path 2900.

Similarly, the electronic control unit may open the second cut valve 1621 to discharge the pressurized medium applied to the third and fourth wheel cylinders 23 and 24 to the reservoir 1100. By opening the second cut valve 1621, the pressurized medium applied to the third and fourth wheel cylinders 23 and 24 may be discharged to the reservoir 1100 by sequentially passing through the second backup flow path 1620, the second master chamber 1230a, and the second cut-off hole 1230d, and the second reservoir flow path 1720.

By removing the hydraulic pressure of the pressurized medium applied to first to fourth wheel cylinders 21, 22, 23, and 24 by the inspection preparation mode, and setting the electronic brake system 2000 to an initial state, the accuracy of the inspection modes to be described below may be promoted.

After performing the inspection preparation mode, the electronic control unit may enter the inspection mode to inspect whether or not there is a leak in the integrated master cylinder 2200 and the simulator valve 1711.

Figure 9:
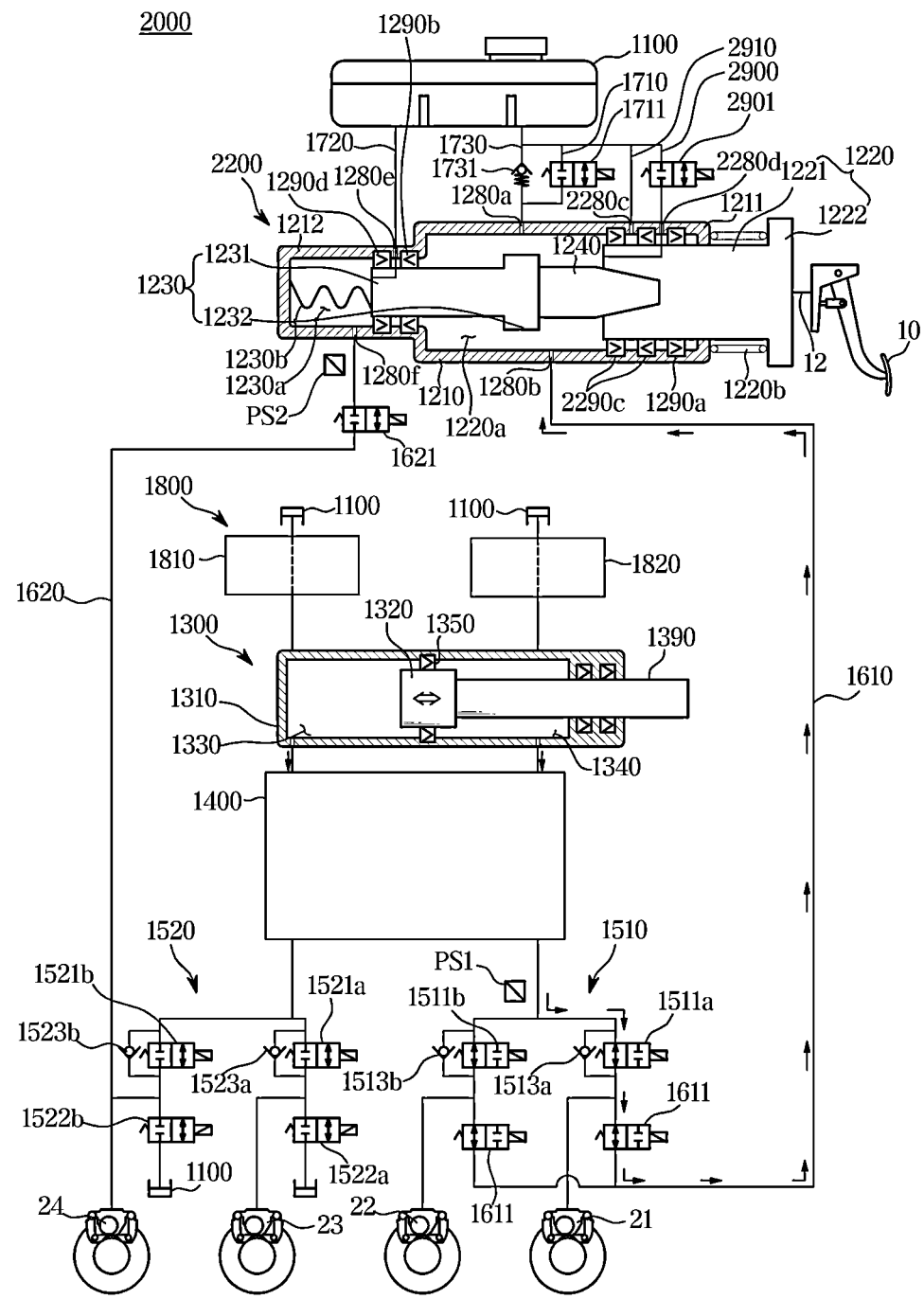
FIG. 9 is a hydraulic circuit diagram illustrating a state in which the electronic brake system according to the second embodiment of the present invention performs an inspection mode.

FIG. 9 is a hydraulic circuit diagram illustrating a state in which the electronic brake system 2000 according to the second embodiment of the present invention performs the inspection mode. Referring to FIG. 9, the electronic control unit operates a motor to move the hydraulic piston 1320 forward or backward and generate hydraulic pressure in pressure chambers 1330 and 1340. At the same time, the simulator valve 1711, the inspection valve 2901, the third and fourth inlet valves 1521a and 1521b, and the second cut valve 1621 are closed, and first and second inlet valves 1511a and 1511b and the first cut valve 1611 are opened. Thereby, the hydraulic pressure generated in the first pressure chamber 1330 is introduced into the first master chamber 1220a by sequentially passing through the hydraulic pressure control unit 1400, the first and second inlet valves 1511a and 1511b of the first hydraulic circuit 1510, and the first backup flow path 1610. At this time, since the second cut valve 1621 is put into the closed state, the second master chamber 1230a is sealed.

In this state, the electronic control unit may inspect whether or not there is a leak in the integrated master cylinder 2200 and the simulator valve 1711 by comparing a pressure value measured by a first pressure sensor PS1 and a pressure value measured by a second pressure sensor PS2. Specifically, when there is no leak in the component elements mounted in the integrated master cylinder 2200 and the simulator valve 1711, as soon as the hydraulic pressure value of the hydraulic pressure supply device 1300 measured by the first pressure sensor PS1 reaches a target pressure, the corresponding hydraulic pressure may be introduced into the first master chamber 1220a through the first backup flow path 1610 and pressurizes the second master piston 1230 forward, so that the hydraulic pressure value of the second master chamber 1230a detected by the second pressure sensor PS2 and the first hydraulic pressure values detected by the pressure sensor PS1 may be synchronized with each other. When the hydraulic pressure value detected by the first pressure sensor PS1 and the hydraulic pressure value detected by the second pressure sensor PS2 are synchronized for a predetermined period of time, the electronic control unit may determine that the hydraulic pressure value is in a normal state and end the inspection mode.

In contrast, when the hydraulic pressure value measured by the second pressure sensor PS2 is lower than the hydraulic pressure value measured by the first pressure sensor PS1, it may be determined that there is a leak in the integrated master cylinder 2200 and the simulator valve 1711. Specifically, when the hydraulic pressure value of the pressurized medium pressurized by the hydraulic pressure supply device 1300, which is measured by the first pressure sensor PS1, reaches the target pressure and then the corresponding hydraulic pressure is maintained for a certain period of time, but the hydraulic pressure value of the second master chamber 1220*a* detected by the second pressure sensor PS2 is lower than the hydraulic pressure value detected by the first pressure sensor PS1 or the hydraulic pressure value detected by the first pressure sensor PS1 also gradually decreases, the electronic control unit may consider that the hydraulic pressure of the second master chamber 1230*a* does not reach the target pressure due to the presence of a leak in the integrated master cylinder 2200 and the simulator valve 1711 and determine that the hydraulic pressure value is in an abnormal state.

As such, the electronic brake system 2000 according to the second embodiment of the present invention may determine whether or not various component elements provided in the integrated master cylinder 1200, specifically, the first sealing member 1290*a*, the second sealing member 2290*b*, the fourth sealing member 1290*d*, the simulator valve 1711, and the simulator check valve 1731 are normal through the inspection mode. Furthermore, the electronic brake system 1000 may also determine whether or not peripheral component elements connected to the integrated master cylinder 2200, such as the second cut valve 1621 and the like, are normal.

When it is determined that there is a leak in the component elements of the integrated master cylinder 2200 or the simulator valve 1711 as a result of the inspection mode, the electronic control unit may inform the driver of the abnormal state through a display or a warning sound and guide the driver to restrict the operation of the vehicle.

The invention claimed is:

1. An electronic brake system comprising:
   a reservoir in which a pressurized medium is stored;
   an integrated master cylinder equipped with a master piston connected to a brake pedal, a master chamber whose volume is varied by a displacement of the master piston, and a sealing member configured to seal the master chamber;
   a simulator valve configured to control a flow of the pressurized medium between the reservoir and the master chamber;
   a hydraulic pressure supply device configured to generate hydraulic pressure by operating a hydraulic piston by an electrical signal output in response to a displacement of the brake pedal;
   a hydraulic pressure control unit provided between the hydraulic pressure supply device and a plurality of wheel cylinders to control the flow of the pressurized medium supplied to the plurality of wheel cylinders;
   a dump controller provided between the reservoir and the hydraulic pressure supply device to control the flow of the pressurized medium;
   a backup flow path connecting the master chamber and the hydraulic pressure control unit;
   a cut valve provided on the backup flow path to control the flow of the pressurized medium;
   a first pressure sensor configured to detect the hydraulic pressure provided by the hydraulic pressure supply device;
   a second pressure configured to detect hydraulic pressure of the master chamber;
   an inspection flow path connecting the master chamber and the dump controller; and
   an inspection valve provided on the inspection flow path to control the flow of the pressurized medium.

2. The electronic brake system of claim 1, wherein the integrated master cylinder includes a first master piston connected to the brake pedal, a first master chamber whose volume is varied by a displacement of the first master piston, a second master piston provided to be displaceable by the displacement of the first master piston, a second master chamber whose volume is varied by a displacement of the second master piston, and a pedal simulator provided between the first master piston and the second master piston and made of a compressible and expandable elastic material, and
   the second pressure sensor detects hydraulic pressure of the second master chamber.

3. The electronic brake system of claim 2, wherein the inspection flow path has one end connected to the dump controller side and the other end branched into a first branch flow path and a second branch flow path that are each connected to the first master chamber,
   the inspection valve is provided at one end side of the inspection flow path, and
   the electronic brake system further comprises:
   a first inspection check valve provided on the first branch flow path and allowing only a flow of the pressurized medium from the dump controller toward the first master chamber; and
   a second inspection check valve provided on the second branch flow path and allowing only a flow of the pressurized medium from the first master chamber toward the dump controller.

4. The electronic brake system of claim 3, wherein the hydraulic pressure supply device includes a first pressure chamber provided in front of the hydraulic piston and a second pressure chamber provided behind the hydraulic piston,
   the dump controller includes a first dump controller configured to control a flow of the pressurized medium between the first pressure chamber and the reservoir, and a second dump controller configured to control a flow of the pressurized medium between the second pressure chamber and the reservoir, and
   the one end of the inspection flow path is connected to the second dump controller side.

5. The electronic brake system of claim 2, further comprising a first reservoir flow path connecting the reservoir and the first master chamber,
   wherein the simulator valve is provided on the first reservoir flow path.

6. The electronic brake system of claim 2, wherein the hydraulic pressure control unit includes a first hydraulic circuit configured to control a flow of the pressurized medium supplied to a first wheel cylinder and a second wheel cylinder, and a second hydraulic circuit configured to control a flow of the pressurized medium supplied to a third wheel cylinder and a fourth wheel cylinder,
   the backup flow path includes a first backup flow path connecting the first master chamber and the first hydraulic circuit, and a second backup flow path connecting the second master chamber and the second hydraulic circuit, and
   the cut valve includes a first cut valve provided on the first backup flow path to control the flow of the pressurized medium, and a second cut valve provided in the second master chamber to control the flow of the pressurized medium.

7. The electronic brake system of claim 4, wherein the integrated master cylinder further includes:

a first sealing member configured to seal the first master chamber from the outside and a second sealing member configured to seal the first master chamber from the second master chamber; and a third sealing member configured to block a flow of the pressurized medium introduced into the first master chamber from the first branch flow path.

8. The electronic brake system of claim 7, further comprising a second reservoir flow path connecting the reservoir and the second master chamber, wherein the integrated master cylinder further includes a fourth sealing member configured to block a flow of the pressurized medium discharged from the second master chamber to the second reservoir flow path.

9. The electronic brake system of claim 7, wherein the first sealing member is provided at a rear side of the third sealing member, and the second branch flow path is connected between the first sealing member and the third sealing member on the integrated master cylinder.

10. The electronic brake system of claim 9, wherein the first master piston includes a first cut-off hole that allows the first master chamber to communicate with the second branch flow path in a non-operating state, and the second master piston includes a second cut-off hole that allows the second master chamber to communicate with the second reservoir flow path in the non-operating state.

11. An electronic brake system comprising:

a reservoir in which a pressurized medium is stored;

an integrated master cylinder equipped with a master piston connected to a brake pedal, a master chamber whose volume is varied by a displacement of the master piston, and a sealing member to configured to seal the master chamber;

a simulator valve configured to control a flow of the pressurized medium between the reservoir and the master chamber;

a hydraulic pressure supply device configured to generate hydraulic pressure by operating a hydraulic piston by an electrical signal output in response to a displacement of the brake pedal;

a hydraulic pressure control unit provided between the hydraulic pressure supply device and a plurality of wheel cylinders to control the flow of the pressurized medium supplied to the plurality of wheel cylinders;

a backup flow path connecting the master chamber and the hydraulic pressure control unit;

a cut valve provided on the backup flow path to control the flow of the pressurized medium;

a first pressure sensor configured to detect the hydraulic pressure provided by the hydraulic pressure supply device;

a second pressure sensor configured to detect hydraulic pressure of the master chamber;

an inspection flow path connecting the reservoir and the master chamber; and an inspection valve provided on the inspection flow path to control the flow of the pressurized medium, wherein the master piston includes a cut-off hole that allows the master chamber to communicate with the inspection flow path in a non-operating state and blocks the master chamber from the inspection flow path when the displacement occurs.

12. The electronic brake system of claim 11, wherein the integrated master cylinder includes a first master piston connected to the brake pedal, a first master chamber whose volume is varied by a displacement of the first master piston, a second master piston provided to be displaceable by the displacement of the first master piston, a second master chamber whose volume is varied by a displacement of the second master piston, and a pedal simulator provided between the first master piston and the second master piston and made of a compressible and expandable elastic material, the first master piston includes a first cut-off hole that allows the first master chamber to communicate with the inspection flow path in a non-operating state, and the second pressure sensor detects hydraulic pressure of the second master chamber.

13. The electronic brake system of claim 12, wherein the inspection flow path has one end connected to the reservoir side and the other end connected to the first master chamber.

14. The electronic brake system of claim 12, further comprising a first reservoir flow path connecting the reservoir and the first master chamber, wherein the simulator valve is provided on the first reservoir flow path.

15. The electronic brake system of claim 12, wherein the hydraulic pressure control unit includes a first hydraulic circuit configured to control a flow of the pressurized medium supplied to a first wheel cylinder and a second wheel cylinder, and a second hydraulic circuit configured to control a flow of the pressurized medium supplied to a third wheel cylinder and a fourth wheel cylinder, the backup flow path includes a first backup flow path connecting the first master chamber and the first hydraulic circuit, and a second backup flow path connecting the second master chamber and the second hydraulic circuit, and the cut valve includes a first cut valve provided on the first backup flow path to control the flow of the pressurized medium, and a second cut valve provided in the second master chamber to control the flow of the pressurized medium.

16. The electronic brake system of claim 13, further comprising an auxiliary inspection flow path connecting the reservoir and the first master chamber, wherein the integrated master cylinder further includes:

a first sealing member configured to seal the first master chamber from the outside and a second sealing member configured to seal the first master chamber from the second master chamber; and a third sealing member configured to block a flow of the pressurized medium introduced into the auxiliary inspection flow path from the first master chamber.

17. The electronic brake system of claim 16, further comprising a second reservoir flow path connecting the reservoir and the second master chamber, wherein the integrated master cylinder further includes a fourth sealing member configured to block a flow of the pressurized medium discharged from the second master chamber to the second reservoir flow path.

18. The electronic brake system of claim 16, wherein the first sealing member is provided at a rear side of the third sealing member, and the inspection flow path is connected between the first sealing member and the third sealing member on the integrated master cylinder.

19. An operating method of the electronic brake system of claim 4, the operating method comprising:

a first inspection mode and a second inspection mode for inspecting whether or not there is a leak in the integrated master cylinder or the simulator valve, wherein in the first inspection mode, the hydraulic piston is moved forward so that the hydraulic pressure formed in the first pressure chamber is supplied to the first master chamber by sequentially passing through the hydraulic pressure control unit, the hydraulic circuit, and the backup flow path, and an electronic control unit determines whether or not there is the leak by comparing a hydraulic pressure value detected by the first pressure sensor and a hydraulic pressure value detected by the second pressure sensor.

20. The operating method of claim 19, wherein in the second inspection mode, the second pressure chamber is blocked from the reservoir by the second dump controller and the inspection valve is opened to allow the second pressure chamber to communicate with the inspection flow path, and the hydraulic piston is moved backward to generate hydraulic pressure in the second pressure chamber, and the electronic control unit determines whether or not there is the leak based on a displacement amount of the hydraulic piston.

\* \* \* \* \*